(12) United States Patent
Terazaki et al.

(10) Patent No.: US 10,231,266 B2
(45) Date of Patent: Mar. 12, 2019

(54) COMMUNICATION DEVICE, COMMUNICATION METHOD AND RECORDING MEDIUM

(71) Applicant: CASIO COMPUTER CO., LTD., Shibuya-ku, Tokyo (JP)

(72) Inventors: Tsutomu Terazaki, Hamura (JP); Takahiro Tomida, Hamura (JP); Ryo Okumura, Hamura (JP); Toshihiro Takahashi, Hamura (JP)

(73) Assignee: CASIO COMPUTER CO., LTD., Tokyo (JP)

(*) Notice: Subject to any disclaimer, the term of this patent is extended or adjusted under 35 U.S.C. 154(b) by 42 days.

(21) Appl. No.: 15/386,047

(22) Filed: Dec. 21, 2016

(65) Prior Publication Data

US 2017/0208633 A1 Jul. 20, 2017

(30) Foreign Application Priority Data

Jan. 20, 2016 (JP) ................................. 2016-008434

(51) Int. Cl.
  *H04J 3/22* (2006.01)
  *H04W 76/10* (2018.01)
  *H04W 74/08* (2009.01)
  *H04W 84/12* (2009.01)
  *H04W 80/02* (2009.01)

(52) U.S. Cl.
  CPC .......... *H04W 76/10* (2018.02); *H04W 74/08* (2013.01); *H04W 80/02* (2013.01); *H04W 84/12* (2013.01); *Y02D 70/142* (2018.01); *Y02D 70/144* (2018.01); *Y02D 70/20* (2018.01)

(58) Field of Classification Search
  None
  See application file for complete search history.

(56) References Cited

U.S. PATENT DOCUMENTS

| | | | |
|---|---|---|---|
| 2002/0107922 A1* | 8/2002 | Nakamura | H04L 41/0253 709/205 |
| 2010/0195552 A1* | 8/2010 | Ho | H04W 52/0216 370/311 |
| 2010/0202354 A1* | 8/2010 | Ho | G06Q 10/06 370/328 |
| 2010/0309869 A1* | 12/2010 | Kim | H04W 76/36 370/329 |

(Continued)

FOREIGN PATENT DOCUMENTS

WO 2013/014757 A1 1/2013

*Primary Examiner* — Kwang B Yao
*Assistant Examiner* — Juvena Loo
(74) *Attorney, Agent, or Firm* — Amin, Turocy & Watson LLP

(57) ABSTRACT

According to an aspect of the present invention, a device for communication according to a specific communication protocol includes a processor for generating a connection request frame for requesting a connection to other device based on the communication protocol. The connection request frame includes a predetermined field. The processor initiates data communication at predetermined timing in a given time interval in the case of setting the predetermined field of the connection request frame to a predetermined value and receiving a connection assignment frame for accepting the connection request from the other device.

8 Claims, 21 Drawing Sheets

(56) References Cited

U.S. PATENT DOCUMENTS

| | | | |
|---|---|---|---|
| 2011/0007672 A1* | 1/2011 | Park | H04W 16/14 370/280 |
| 2012/0155279 A1* | 6/2012 | Ho | H04L 47/522 370/241 |
| 2013/0329690 A1* | 12/2013 | Kim | H04W 36/0072 370/329 |
| 2014/0369268 A1* | 12/2014 | Huang | H04L 1/00 370/329 |

\* cited by examiner (A)

(B)

(C)

(D)

(A)

(B)

COMMUNICATION DEVICE, COMMUNICATION METHOD AND RECORDING MEDIUM

CROSS-REFERENCE TO RELATED APPLICATIONS

This application is based upon and claims the benefit of priority under 35 USC 119 of Japanese Patent Application No. 2016-008434 filed on Jan. 20, 2016, the entire disclosure of which is incorporated herein by reference in its entirety for all purposes.

BACKGROUND OF THE INVENTION

1. Field of the Invention

The present invention relates to a communication device, a communication method, and a computer readable recording medium for recording a program for executing the communication method.

2. Description of the Related Art

Conventionally, many research studies have been done on application of the information communication technology to fields where devices disposed in close vicinity to a human body are used, such as health and medical care. The institute of electrical and electronics engineers (IEEE) 802 LAN/MAN Standards Committee proposed the 802.15.6 standard protocol for the purpose of low-power local area wireless communication for Body Area Network (BAN) applications.

The IEEE 802.15.6 protocol defines a physical (PHY) layer and a medium access control (MAC) sublayer for the wireless BAN (also referred to as WBAN) operating in-body, on-body, or off-body. Here, the "body" is not limited to the human body and includes bodies of animals and organisms having propagation environment similar to the human body.

According to the IEEE 802.15.6 protocol, a device belonging to a BAN serves as a hub or a node. One hub and one or more nodes form an independent network. For example, the node is a small sensor such as a pulsimeter, an electrocardiograph, or an acceleration sensor which is attached to a user's body to monitor the user's physical condition and the hub is a terminal for collecting data from each sensor. Generally, a terminal serving as the hub has larger battery capacity than a sensor serving as the node because the terminal serving as the hub is not necessarily required to be directly attached to the user's body and should collect data from a plurality of sensors connected thereto. On the contrary, since the node is often powered by a small battery, it is important to reduce power consumed for communication in order to increase device operating time of the node.

Generally, a node waits for receiving a poll or data from a hub and performs transmission of data after receiving the poll or data from the hub in a given allocation slot in a bilink for bidirectional communication, as disclosed in PCT Publication No. WO2013/014757 published on Jan. 31, 2013.

SUMMARY OF THE INVENTION

According to the conventional technology as described above, the node should maintain a receivable state until it receives the poll or data from the hub. For an unscheduled allocation in which an allocation slot can be shifted in time, the receipt standby time may be too long. This receipt standby time results in increase of power consumption of the node.

An object of the present invention is to provide a communication method for reducing power consumption of a terminal by reducing the standby time for data communication, a device for executing the communication method, and a computer readable recording medium for recording a program for executing the communication method.

According to one aspect of the invention, a device for communication according to a specific communication protocol includes a processor for generating a connection request frame for requesting a connection to other device based on the communication protocol. The connection request frame includes a predetermined field. The processor initiates data communication at predetermined timing in a time interval given for communication with the other device in the case of setting the predetermined field of the connection request frame to a predetermined value and receiving a connection assignment frame for accepting the connection request from the other device.

According to one aspect of the invention, a device for communication according to a specific communication protocol includes a processor for generating a connection assignment frame for accepting a connection request of other device based on the communication protocol. The connection assignment frame includes a predetermined field. The processor does not transmit any data frame until the other device initiates data communication in the case of setting the predetermined field of the connection assignment frame to a predetermined value.

According to embodiments of the present invention, it is possible to reduce power consumption of a terminal for communication.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention will more sufficiently be understood by the following detailed description and the accompanying drawings, which are intended exclusively for explanation and do not limit the scope of the present invention.

Here.

DETAILED DESCRIPTION OF THE PREFERRED EMBODIMENT

In the present specification, the invention will be mainly described in connection with embodiments in which it has been applied to the BAN but its application field is not limited to the BAN. For example, the invention can be applied to different wireless communication technologies such as Bluetooth®, Wi-Fi®, and Wi-Fi Direct®.

Hereinafter, embodiments of the present invention will be described with reference to the accompanying drawings. The scope of the invention is not intended to be limited to the illustrated examples.

Figure 1:
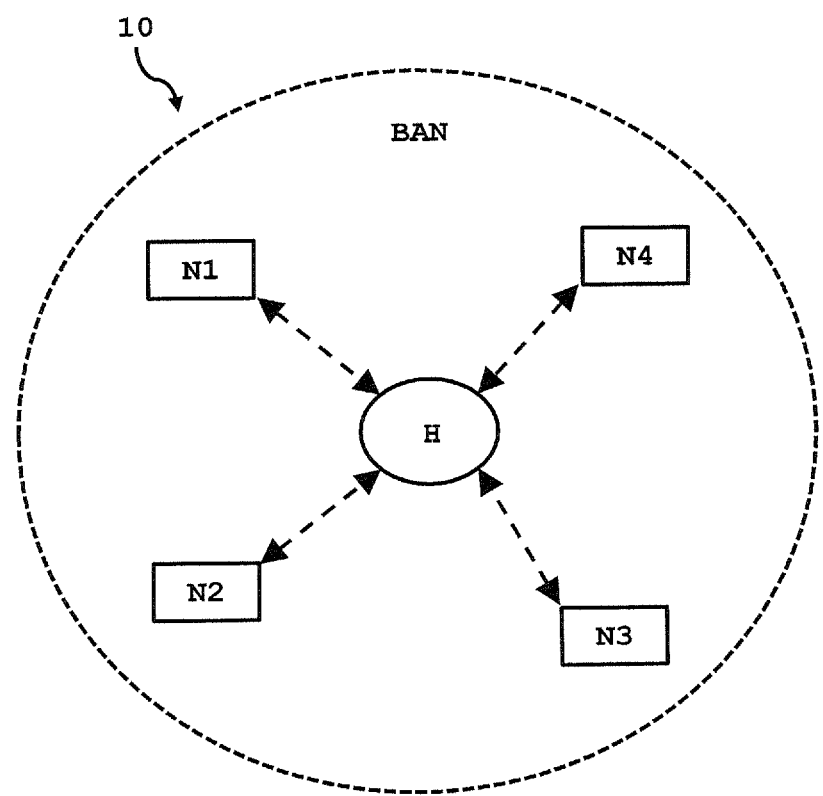
FIG. 1 is a diagram showing a topology of a body area network (BAN).

FIG. 1 is a diagram showing a topology of the body area network (BAN). A BAN 10 includes a device, which plays the role of a hub H, and one or more devices each of which plays the role of a node N. There is to be one and only one hub in a BAN, whereas the number of nodes in the BAN is to range from zero to the maximum number of nodes connectable to the hub (mMaxBANSize). In the example shown in FIG. 1, four nodes N1 to N4 belong to the BAN 10, but the number of nodes is not limited to this example. The hub H is a mobile terminal such as a smart phone or a personal digital assistant (PDA), or an electronic timepiece provided with a communication function, for example. The node N is a bio-signal measuring device, a bio-signal monitoring device or a sensor for measuring/receiving bio-signals and transmitting to the hub H, or an electronic timepiece including one or more of them, for example.

Figure 2:
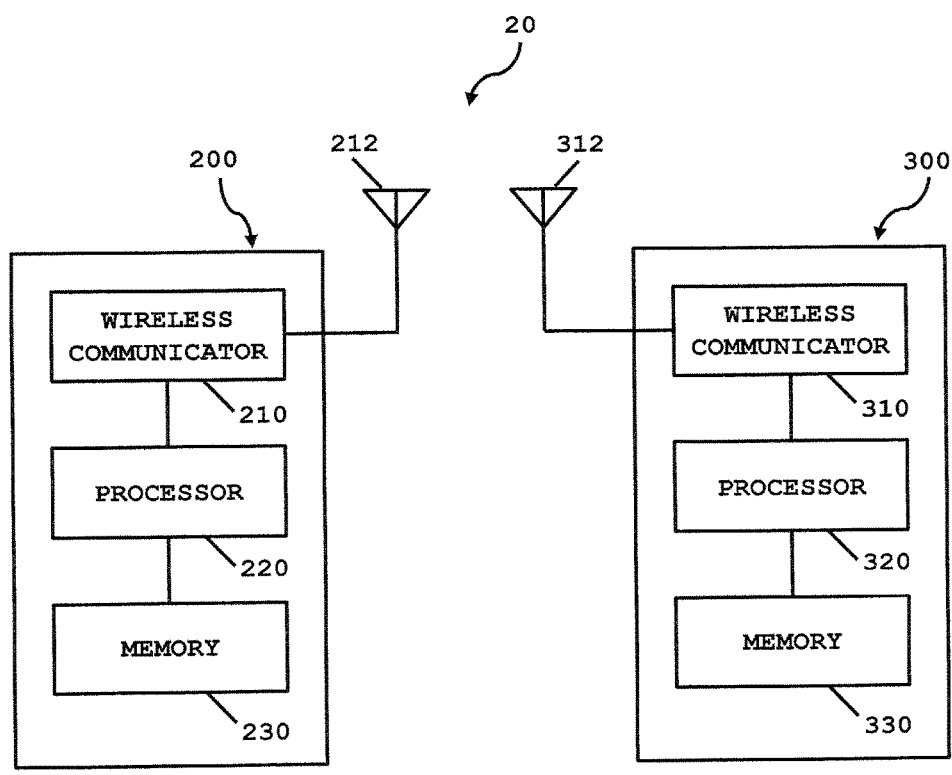
FIG. 2 is a block diagram showing a communication system according to an embodiment of the invention.

FIG. 2 is a block diagram showing a communication system according to an embodiment of the invention. In the present embodiment, a communication system 20 includes a device 200 serving as a hub and a device 300 serving as a node. Although the example of FIG. 2 depicts one node communicating with the hub, the number of node(s) connectable to the hub is not limited to this example. The device 200 communicates with one or more nodes and controls them. The device 300 is a low-power wireless node operating in, on, or around the body (not limited to the human body) for one or more applications such as a medical device, an electronic appliance, or a personal amusement device.

The device 200 includes a wireless communicator 210, a processor 220, and a memory 230. The processor 220 processes messages exchanged via an antenna 212 and the wireless communicator (or, a transceiver) 210 and/or via a wireline connected to the internet or a different body area network (not shown in the drawings). The antenna 212 transmits and receives electromagnetic waves of a frequency corresponding to a wireless communication method adopted by the processor 220. The wireless communicator 210 includes a circuit for transforming an electric signal input from the processor 220 into an electromagnetic wave or transforming a received electromagnetic wave into an electric signal to output it to the processor 220. These electric signals are transmitted and received on a frame-by-frame basis. In the present embodiment, the processor 220 generates a frame to be transmitted to other device, for example, the device 300, according to the BAN protocol, and processes (for example, decodes) a frame received from other device, for example, the device 300, according to the BAN protocol. The processor 220 may include software, firmware, hardware, or a combination thereof.

The memory 230 can be used to store frame structure information, medium access control information, power management information, or the like, as well as data of frames transmitted or received (hereinafter, referred to as "frame data"). In particular, information on history of connections between the device 200 and other devices (hereinafter, referred to as "history information") can be stored in the memory 230. The history information may include information recorded in a MAC frame received from other device. The information recorded in the MAC frame includes MAC Capability and PHY Capability of the other device, for example. Further, the memory 230 may also be used to store computer program instructions, software and/or firmware executed by the processor 220. The memory 230 may be any storage device such as a RAM (Random Access Memory), a ROM (Read Only Memory), a flash memory, or a disk drive integrated into or removable from the communication device 200. Alternatively, the memory 230 may be any storage device integrated into or removable from the processor 220.

The device 300 includes a wireless communicator 310, a processor 320, and a memory 330. The processor 320 processes messages exchanged via an antenna 312 and the wireless communicator (or, a transceiver) 310. The antenna 312 transmits and receives electromagnetic waves of a frequency corresponding to a wireless communication method adopted by the processor 320. The wireless communicator 310 includes a circuit for transforming an electric signal input from the processor 320 into an electromagnetic wave or transforming a received electromagnetic wave into an electric signal to output it to the processor 320. In the present embodiment, the processor 320 generates a frame to be transmitted to other device, for example, the device 200, according to the BAN protocol, and processes a frame received from other device, for example, the device 200, according to the BAN protocol. The processor 320 may include software, firmware, hardware, or a combination thereof.

The memory 330 can be used to store the frame structure information, the medium access control information, the power management information, or the like, as well as the frame data transmitted or received. In particular, information recorded in a MAC frame received from other device, for example, the device 200 can be stored in the memory 330. The information recorded in the MAC frame includes MAC Capability of the other device, for example. Further, the memory 330 may also be used to store computer program instructions, software and/or firmware executed by the processor 320. The memory 330 may be any storage device such as a RAM (Random Access Memory), a ROM (Read Only Memory), a flash memory, or a disk drive integrated into or removable from the communication device 300. Alternatively, the memory 330 may be any storage device integrated into or removable from the processor 320.

The device 200 or 300 can be connected to a sensor (not shown in the drawings) used to monitor data from the body such as body temperature, respiration, heart rate, or blood sugar, or a device (not shown in the drawings) for providing a function of controlling a pace maker, a respirator, an insulin pump, or the like, for example.

The network 10 shown in FIG. 1 and the system 20 shown in FIG. 2 are merely examples and do not limit the scope of systems or devices capable of implementing frame generating methods or frame processing methods described herein. Any device for performing communication according to the present invention falls within the scope of the invention.

Figure 3:
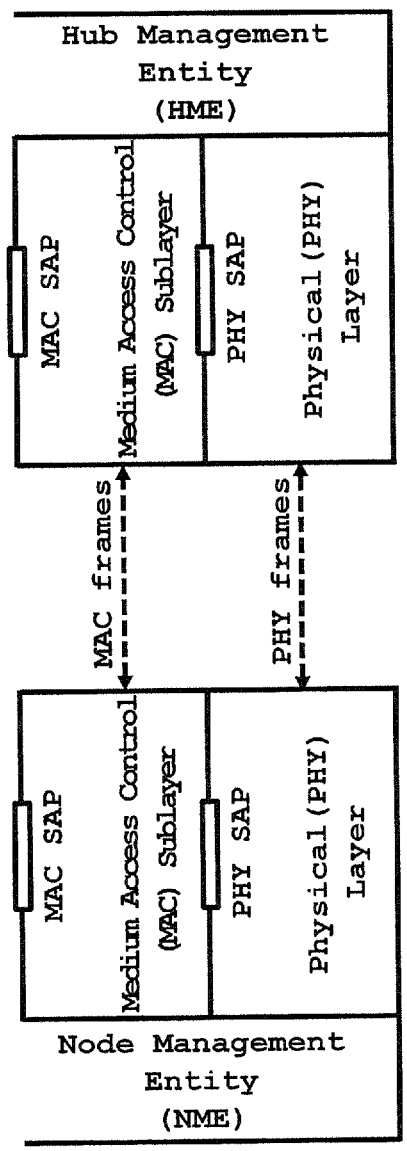
FIG. 3 is a diagram showing a physical (PHY) layer and a medium access control (MAC) sublayer in a hub or a node.

The hub 200 or the node 300 is internally partitioned into a physical (PHY) layer and a medium access control (MAC) sublayer. FIG. 3 is a diagram showing the PHY layer and the MAC sublayer according to the ISO/OSI-IEEE 802 reference model. Direct communications between the node and the hub are to transpire at the PHY layer and the MAC sublayer. In the present embodiment, the PHY layer and the MAC sublayer of the node or the hub are to use only one operating channel at any given time. However, the present invention is not limited thereto.

Within the node or the hub, the MAC provides its service to the MAC client (higher layer) through the MAC service access point (SAP) located immediately above the MAC sublayer, while the PHY provides its service to the MAC through the PHY SAP located between them. On transmission, the MAC client passes MAC service data units (MSDUs) to the MAC sublayer via the MAC SAP, and the MAC sublayer passes MAC frames (also known as MAC protocol data units or MPDUs) to the PHY layer via the PHY SAP. On reception, the PHY layer passes MAC frames to the MAC sublayer via the PHY SAP, and the MAC sublayer passes MSDUs to the MAC client via the MAC SAP.

Figure 4:
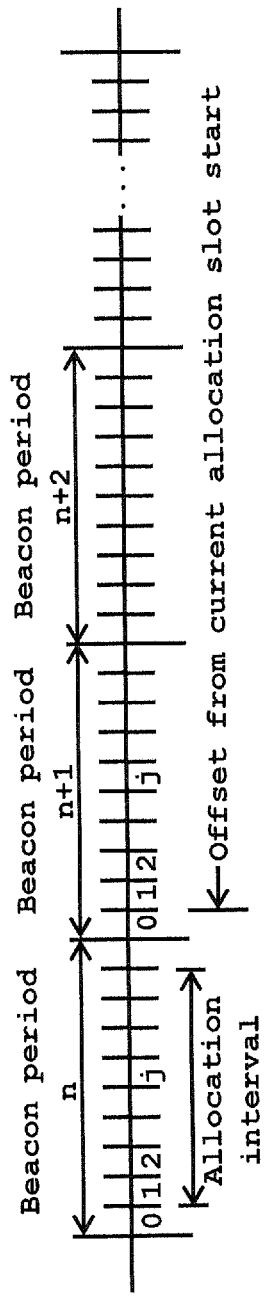
FIG. 4 is a diagram showing a time reference base of the BAN.

In the following, the medium access will be described referring to FIGS. 4 and 5. All nodes and hubs are to establish a time reference base, as shown in FIG. 4, if their medium access is to be scheduled in time. To provide or support time referenced allocations in its BAN, the hub shall establish a time base, which divides the time axis into beacon periods (superframes) regardless of whether it is to transmit beacons. Each beacon period is composed of allocation slots of equal length and numbered from 0, 1, . . . , s, where s≤255. In such cases, the hub shall transmit a beacon in each beacon period (superframe), except in inactive superframes, or shall not transmit a beacon in any superframe. A beacon is a frame transmitted by the hub in order to let nodes know existence of the network of the hub and make the nodes participate in the network. Further, the beacon is transmitted by the hub to facilitate network management, such as the coordination of medium access and power management of the nodes in the body area network (BAN) of the hub, and to facilitate clock synchronization therein.

According to the IEEE 802.15.6 protocol, the hub shall operate in one of the following three access modes.

(1) Beacon mode with beacon periods (superframes): The hub shall transmit a beacon in each beacon period except in inactive superframes to enable time referenced allocations.

(2) Non-beacon mode with superframes: The hub shall transmit no beacons although access to the medium involves time referencing and superframes and allocation slots are established. In this mode, the hub may have only a managed access phase (MAP) in any superframe.

(3) Non-beacon mode without superframes: Access to the medium involves no time referencing and the hub shall transmit no beacons.

In a network comprising a hub and one or more nodes, various access methods may be used to obtain an allocation interval for initiating frame transactions between the nodes and the hub. The access methods are divided into two main categories: a scheduled access and an unscheduled access. The scheduled access is based on advance reservation and committed scheduling, whereby a node and a hub obtain scheduled reoccurring time intervals for initiating frame transactions. The unscheduled access is a combination of best-effort scheduled access and polling access. In an unscheduled access, the hub grants to the node or to itself non-reoccurring time intervals for initiating frame transactions in an uplink, downlink, or both (called bilink).

A frame transaction comprises a management or data type frame. In an uplink, the node sends management and/or data type frames to the hub, but not the other way around. In a downlink, the hub sends management and/or data type frames to the node, but not the other way around. In a bilink, the node sends management and/or data type frames to the hub, and/or vice versa.

A hub and a node that support unscheduled access may employ unscheduled access to initiate frame transactions in a downlink and/or uplink on a best-effort basis. Support for unscheduled access may be indicated in an exchanged MAC Capability field. Connection Request and Connection Assignment frames may be used to provide advance reservations and tentative allocation interval assignments. To support unscheduled access in beacon or non-beacon mode with superframes, a node shall be always active during time intervals wherein polls and posts are allowed to be sent.

Figure 5:
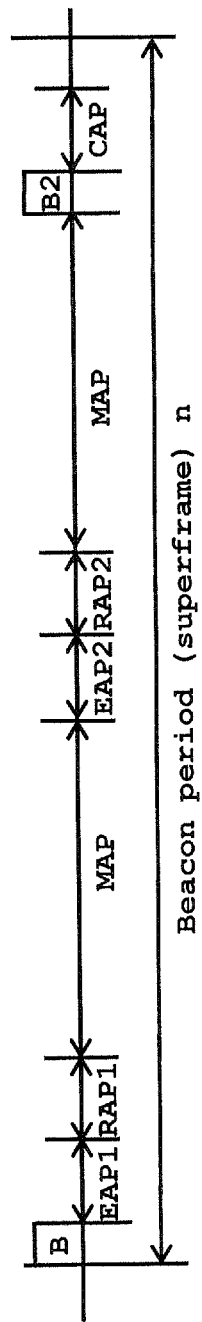
FIG. 5 is a layout of access phases in a beacon period for beacon mode.

FIG. 5 is a layout of access phases in a beacon period for beacon mode. In beacon mode, the hub shall organize access phases in each active beacon period (superframe) as shown in FIG. 5. In FIG. 5, B stands for beacon (B). In an active superframe (beacon period), the hub shall transmit a beacon and may provide access phases. Access phases are used to exchange management, control, and data type frames. In an inactive superframe (beacon period), the hub shall not transmit any beacon and shall not provide any access phases.

The hub shall place exclusive access phase 1 (EAP1), random access phase 1 (RAP1), managed access phase (MAP), exclusive access phase 2 (EAP2), random access phase 2 (RAP2), another managed access phase (MAP), and contention access phase (CAP) in the order shown in FIG. 5. To provide a non-zero length CAP, the hub shall transmit a preceding B2 frame. The hub shall not transmit a B2 frame if the CAP that follows has a zero length.

In order for a hub and a node to communicate data, the node transmits a Connection Request frame to the hub to require allocation slots for the communication. In the case that the hub accepts a connection of the node, one or more frame transactions are performed between the hub and the node in allocation slots specified in a Connection Assignment frame from the hub. In specific, in bilink communication, the node waits for receipt of a transmission command (or, a poll) or a data frame (hereinafter, collectively referred to as a "transmission allowance notice") from the hub in a given allocation slot, and, after receipt of the transmission allowance notice, performs transmission of a data frame. For the unscheduled allocation in which an allocation slot can be shifted in time, the receipt standby time of the node may be too long resulting in increase of power consumption of the node.

In the following, a MAC frame structure of each of a Connection Request frame and a Connection Assignment frame used for BAN communication will be described. The Connection Request frame is a frame transmitted by the node to request creation or modification of a connection with the hub. The Connection Assignment frame is a frame transmitted by the hub to respond to a connection request or to initiate or change a connection assignment. A format of a MAC frame according to the present embodiment is shown in (A) of FIG. 6. The MAC frame includes a fixed-length MAC header, a variable-length MAC frame body, and a fixed length Frame Check Sequence (FCS) field. The Frame Check Sequence (FCS) field is the footer of the MAC frame. The fields contained in the MAC frame will be defined in the following. Each of the figures explained below depicts the fields contained in the MAC frame from left to right in the transmit order, with fields that are optional or selectively absent drawn in dashes. Also indicated is the number of octets contained in each field along with the corresponding octet transmit order, on top of the field. Reserved fields are set to zero on transmission and ignored on reception.

Figure 6:
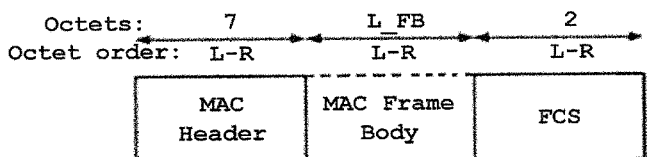
FIG. 6 shows (A) a format of a MAC frame, (B) a format of MAC header, (C) a format of a Frame Control field, and (D) a format of a MAC frame body.
Figure 6:
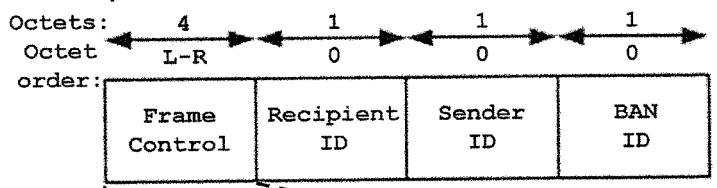
Figure 6:
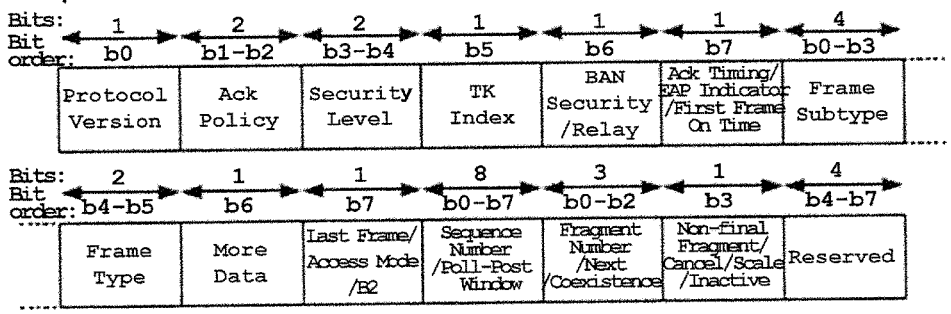
Figure 6:
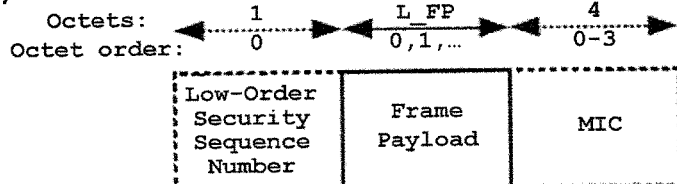

A format of the MAC header according to the present embodiment is shown in (B) of FIG. 6. The MAC header includes Frame Control, Recipient ID, Sender ID, and BAN ID fields. The Recipient ID field is set to the abbreviated address (i.e., NID (Node Identifier) or HID (Hub Identifier)) of the recipient of the current frame. The Sender ID field is set to the abbreviated address (i.e., NID or HID) of the sender of the current frame. The BAN ID field is set to the abbreviated address of the BAN in which the current frame is transferred.

A format of the Frame Control according to the present embodiment is shown in (C) of FIG. 6. Each field of the Frame Control is defined in Section 5.2.1.1 of IEEE Std 802.15.6-2012. Frame Subtype and Frame Type fields of the Frame Control are set to indicate the type of the current frame according to Table 1 below.

TABLE 1

Frame Type and Frame Subtype field encoding

| Frame Type value b5b4 | Frame Type name | Frame Subtype value b3b2b1b0 | Frame Subtype name |
| --- | --- | --- | --- |
| 00 | Management | 0000 | Beacon |
| 00 | Management | 0001 | Reserved |
| 00 | Management | 0010 | Security Association |
| 00 | Management | 0011 | Security Disassociation |
| 00 | Management | 0100 | PTK |
| 00 | Management | 0101 | GTK |
| 00 | Management | 0110-0111 | Reserved |
| 00 | Management | 1000 | Connection Request |
| 00 | Management | 1001 | Connection Assignment |
| 00 | Management | 1010 | Disconnection |
| 00 | Management | 1011-1110 | Reserved |
| 00 | Management | 1111 | Command |
| 01 | Control | 0000 | I-Ack |
| 01 | Control | 0001 | B-Ack |
| 01 | Control | 0010-0011 | Reserved |
| 01 | Control | 0100 | I-Ack + Poll |
| 01 | Control | 0101 | B-Ack + Poll |
| 01 | Control | 0110 | Poll |
| 01 | Control | 0111 | T-Poll |
| 01 | Control | 1000-1101 | Reserved |
| 01 | Control | 1110 | Wakeup |
| 01 | Control | 1111 | B2 |
| 10 | Data | 0000 | User Priority 0 or Allocation Mapped Data Subtype |
| 10 | Data | 0001 | User Priority 1 or Allocation Mapped Data Subtype |
| 10 | Data | 0010 | User Priority 2 or Allocation Mapped Data Subtype |
| 10 | Data | 0011 | User Priority 3 or Allocation Mapped Data Subtype |
| 10 | Data | 0100 | User Priority 4 or Allocation Mapped Data Subtype |
| 10 | Data | 0101 | User Priority 5 or Allocation Mapped Data Subtype |
| 10 | Data | 0110 | User Priority 6 or Allocation Mapped Data Subtype |
| 10 | Data | 0111 | Emergency |
| 10 | Data | 1000-1111 | Allocation Mapped Data Subtype |
| 11 | Reserved | 0000-1111 | Reserved |

As shown in Table 1, the value of the Frame Type indicates the type of the current frame. More specifically, in the case that the value of the Frame Type is 00, the current frame is a Management frame. In the case that the value of the Frame Type is 01, the current frame is a Control frame. In the case that the value of the Frame Type is 10, the current frame is a Data frame. In the case that the value of the Frame Type is 11, the current frame is a Reserved frame. The value of the Frame Subtype is set according to the subtype of the current frame. Thus, the combination of the Frame Type value and the Frame Subtype value indicates the kind of the current frame. For example, in the case that the Frame Type value is 00 and the Frame Subtype value is 0000, the current frame is a beacon frame. In the case that the Frame Type value is 00 and the Frame Subtype value is 1000, the current frame is a Connection Request frame. In the case that the Frame Type value is 00 and the Frame Subtype value is 1001, the current frame is a Connection Assignment frame.

In the case that the Frame Type value is 01 and the Frame Subtype value is 0000, the current frame is an I-Ack frame.

A format of the MAC frame body according to the present embodiment is shown in (D) of FIG. 6. Low-Order Security Sequence Number and Message Integrity Code (MIC) fields are not present in unsecured frames, as indicated by the Security Level field of the Frame Control of the MAC header of the current frame. Frame Payload is a sequence of fields to be communicated to the recipient(s). An I-Ack frame transmitted by a node to a hub contains no Frame Payload. An I-Ack frame transmitted by a hub to a node selectively contains a Frame Payload.

Figure 7:
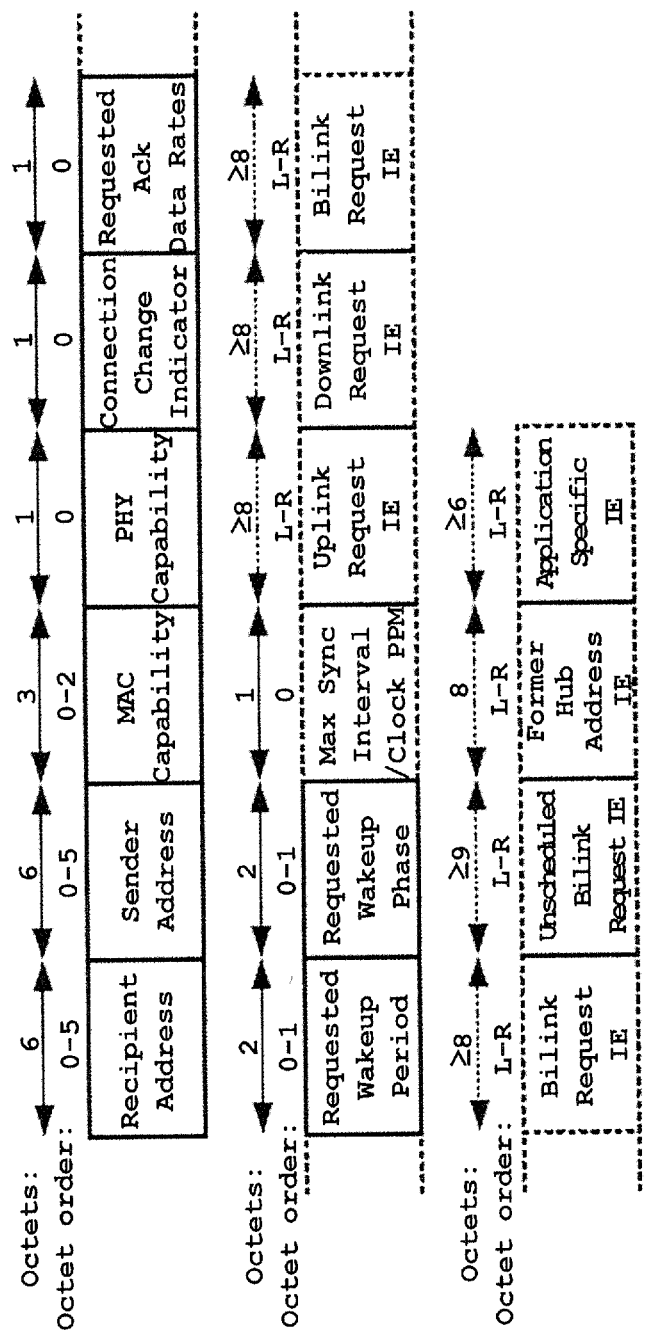
FIG. 7 shows a format of a frame payload of a Connection Request frame.

A Connection Request frame according to the present embodiment includes a frame payload formatted as shown in FIG. 7. The Recipient Address field is set to the EUI-48 (EUI: Extended Unique Identifier) of the recipient of the current frame, or is set to zero if such an EUI-48 is yet unknown. The Sender Address field is set to the EUI-48 of the sender of the current frame. Each of other fields of the frame payload of the Connection Request frame is defined in Section 5.3.6 of IEEE Std 802.15.6-2012.

The Connection Request frame contains information elements (IEs), as shown in FIG. 7. Each information element contains an element ID field which is set to the value that identifies the information element, a length field, and an information field (see (A) of FIG. 8 and (A) of FIG. 9). The length field is set to the length, in octets, of the information field.

Figure 8:
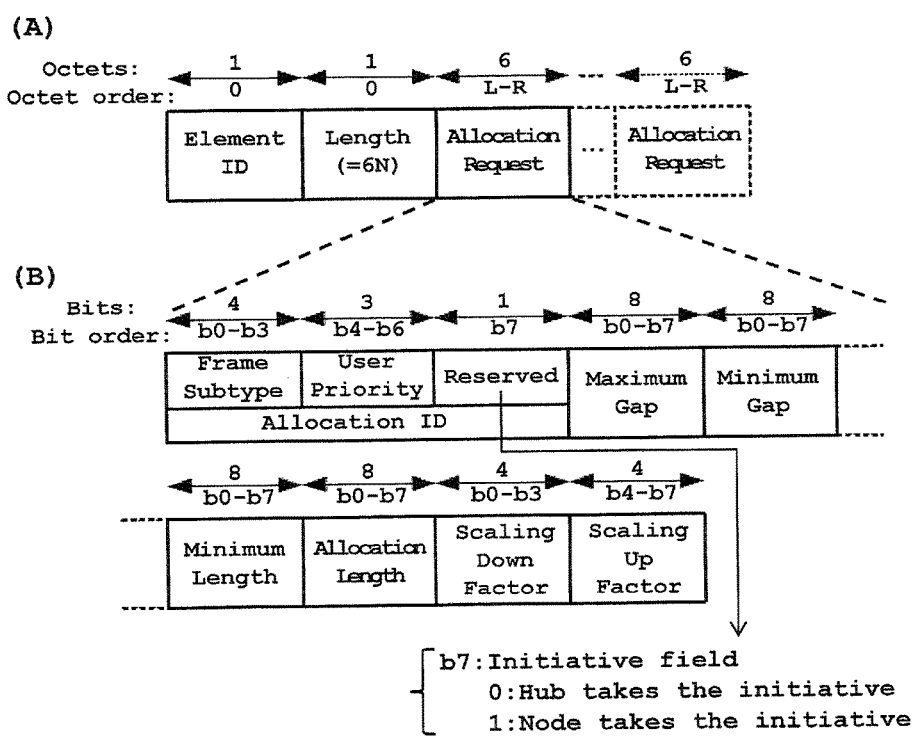
FIG. 8 shows (A) a format of an Uplink Request information element (IE), a Downlink Request IE, a Bilink Request IE, or a Type-I Unscheduled Bilink Request IE of a Connection Request frame, and (B) a format of an Allocation Request field of the IE, according to an embodiment of the invention.
Figure 9:
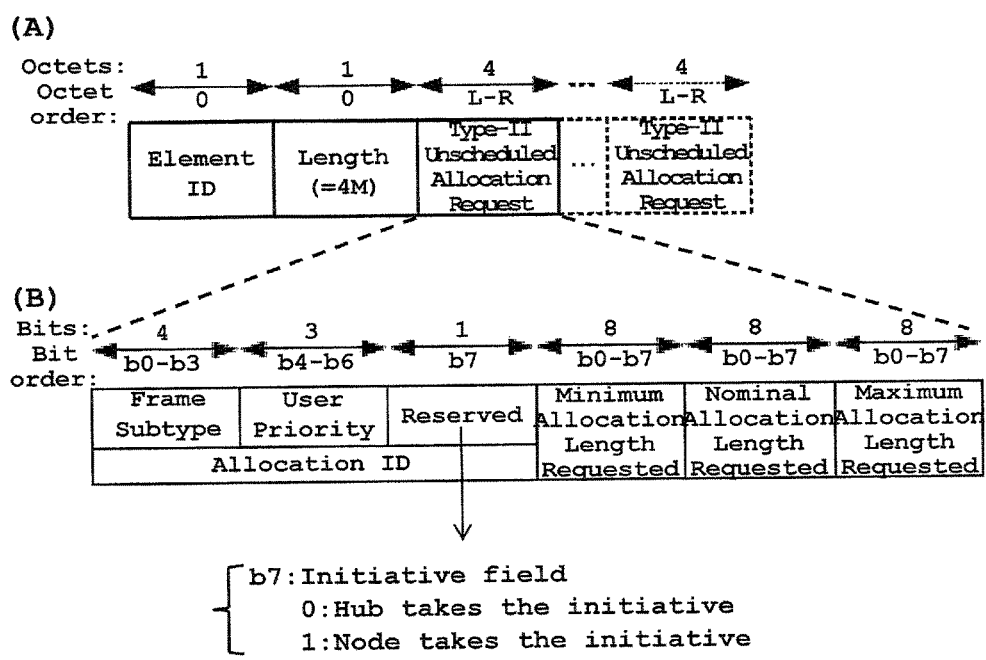
FIG. 9 shows (A) a format of a Type-II Unscheduled Bilink Request IE of a Connection Request frame, and (B) a format of a Type-II Unscheduled Allocation Request field of the IE, according to an embodiment of the invention.

The Uplink Request IE of the Connection Request frame is formatted as shown in (A) of FIG. 8 (where N is the number of Allocation Request fields contained in the IE). The Uplink Request IE is optionally contained in the Connection Request frame to request for creation or modification of one or more scheduled uplink allocations in beacon or non-beacon mode with superframes. One or more Allocation Request fields are present. Each Allocation Request field is formatted as shown in (B) of FIG. 8. As shown in (B) of FIG. 8, the Allocation Request field contains a Reserved field of one (1) bit.

The Downlink Request IE of the Connection Request frame is formatted as shown in (A) of FIG. 8 in conjunction with (B) of FIG. 8. The Downlink Request IE is optionally contained in the Connection Request frame to request for creation or modification of one or more scheduled downlink allocations in beacon or non-beacon mode with superframes.

The Bilink Request IE of the Connection Request frame is formatted as shown in (A) of FIG. 8 in conjunction with (B) of FIG. 8. The Bilink Request IE is optionally contained in the Connection Request frame to request for creation or modification of one or more scheduled bilink allocations in beacon or non-beacon mode with superframes.

The Unscheduled Bilink Request IE of the Connection Request frame, when present, is either Type-I Unscheduled Bilink Request IE or Type-II Unscheduled Bilink Request IE. The Type-I Unscheduled Bilink Request IE is formatted as shown in (A) of FIG. 8 in conjunction with (B) of FIG. 8, and is optionally contained in the Connection Request frame to request for creation or modification of one or more unscheduled bilink allocations in beacon or non-beacon mode with superframes. The Type-II Unscheduled Bilink Request IE is formatted as shown in (A) of FIG. 9 (where M is the number of Type-II Unscheduled Allocation Request fields contained in the IE). The Type-II Unscheduled Bilink Request IE is optionally contained in the Connection Request frame to request for creation or modification of one or more unscheduled bilink allocations in non-beacon mode without superframes. One or more Type-II Unscheduled Allocation Request fields are present in the Type-II Unscheduled Bilink Request IE. Each Type-II Unscheduled Allocation Request field is formatted as shown in (B) of FIG. 9. As shown in (B) of FIG. 9, the Type-II Unscheduled Allocation Request field contains a Reserved field of one (1) bit.

According to an embodiment of the present invention, information for indicating the initiative of data communication is added to Connection Request frames. As shown in (B) of FIG. 8 and (B) of FIG. 9, the node designates one bit which is reserved of the Allocation Request field contained in an IE field of the Connection Request frame as an initiative field. In the case that the node wants to take the initiative of communication with a hub which is a recipient of the Connection Request frame, the node sets the initiative field to one (1). In the case of letting the hub take the initiative of the communication conventionally, the node sets the initiative field to zero (0). More specifically, in the case that the node wants to take the initiative in a scheduled uplink allocation, the node sets the one bit which is reserved in the Allocation Request field of the Uplink Request IE to one (1) as shown in (B) of FIG. 8. In the case that the node wants to take the initiative in a scheduled downlink allocation, the node sets the one bit which is reserved in the Allocation Request field of the Downlink Request IE to one (1) as shown in (B) of FIG. 8. In the case that the node wants to take the initiative in a scheduled bilink allocation, the node sets the one bit which is reserved in the Allocation Request field of the Bilink Request IE to one (1) as shown in (B) of FIG. 8. In the case that the node wants to take the initiative in a Type-I unscheduled bilink allocation, the node sets the one bit which is reserved in the Allocation Request field of the Unscheduled Bilink Request IE to one (1) as shown in (B) of FIG. 8. In the case that the node wants to take the initiative in a Type-II unscheduled bilink allocation, the node sets the one bit which is reserved in the Type-II Unscheduled Allocation Request field of the Unscheduled Bilink Request IE to one (1) as shown in (B) of FIG. 9.

A determination on whether to set the initiative field of a Connection Request frame to be transmitted by the node to one (1) is made based on at least one of the kind of the terminal of the node (for example, whether or not the node is a device for frequently transmitting data), the battery remains of the node, the amount of data to be transmitted, and setting of a user (whether or not there is an input from the user for instructing terminal(s) to operate in low-power mode), for example.

According to the embodiment described above, it is possible to realize data communication led (or, initiated) by the node by including a field indicating a request for the initiative of the data communication in Connection Request frames. In the case that the node transmits a Connection Request frame in which the initiative field is set to one (1) to the hub and the hub receives the Connection Request frame, the hub hands the initiative to the node. In the case that the node takes the initiative of the communication, it can transmit data frame(s) at proper timing without waiting for receipt of a data frame or a poll from the hub, for example. In other words, even if the node which is a terminal transmitting a Connection Request frame does not receive the transmission allowance notice from the hub (in other words, the transmission allowance notice is not used as a trigger), data communication can be started. Thus, there is no necessary for the node to be in a receivable state during waiting for the transmission allowance notice and power consumption of the node can be reduced. In particular, for the unscheduled allocation in which an allocation slot can be shifted in time, the effect of reducing the power consumption of the node can be significant.

Figure 10:
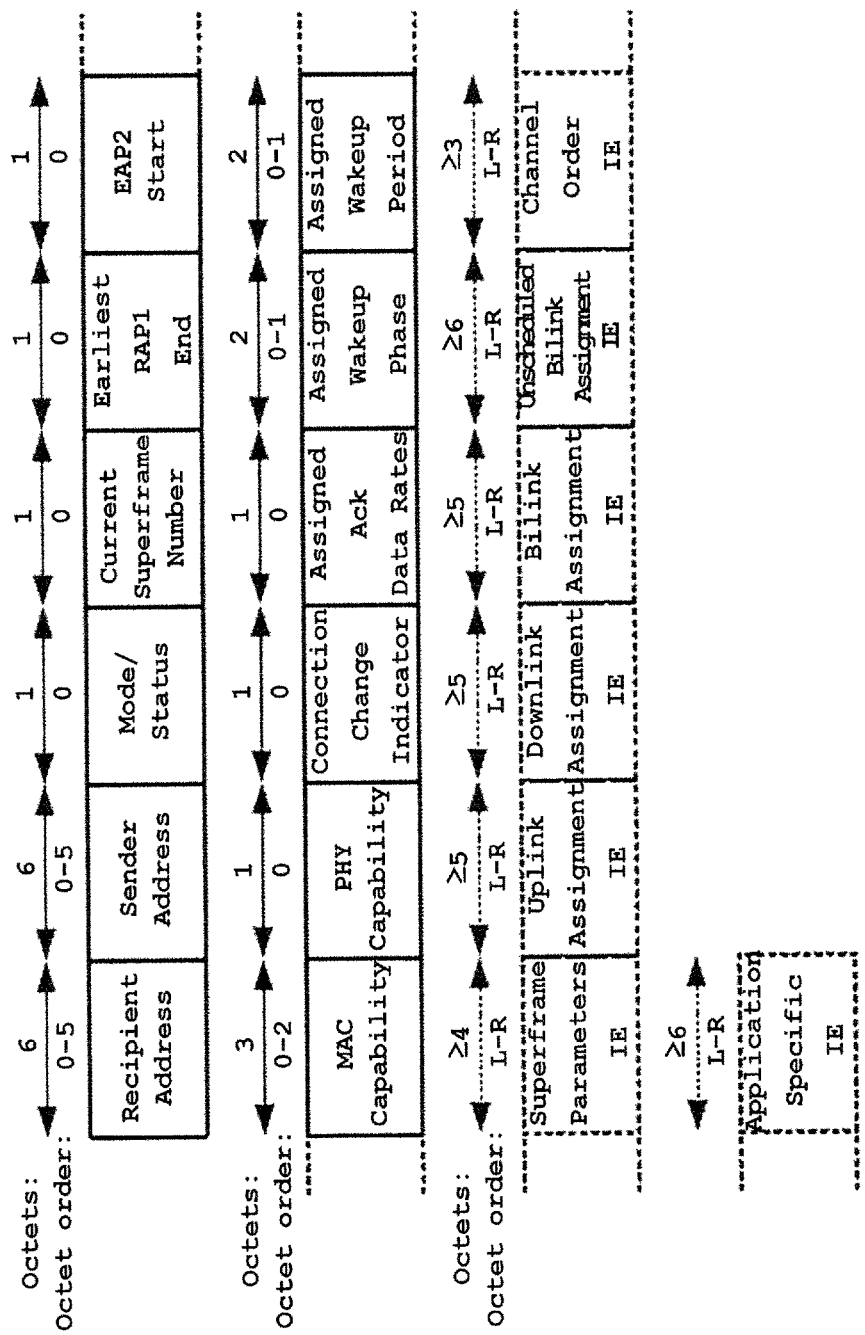
FIG. 10 shows a format of a frame payload of a Connection Assignment frame.

In a different embodiment of the present invention, the hub transmits a Connection Assignment frame containing an initiative field to the node. The Connection Assignment frame according to the present embodiment is formatted as shown in FIG. 10. Each of a plurality of fields included in the frame payload of the Connection Assignment frame is defined in Section 5.3.7 of IEEE Std 802.15.6-2012. As shown in FIG. 10, the Connection Assignment frame contains information elements (IEs). Each information element contains an element ID field which is set to the value that identifies the information element, a length field, and an information field (see (A) of FIG. 11 and (A) of FIG. 12). The length field is set to the length, in octets, of the information field.

Figure 11:
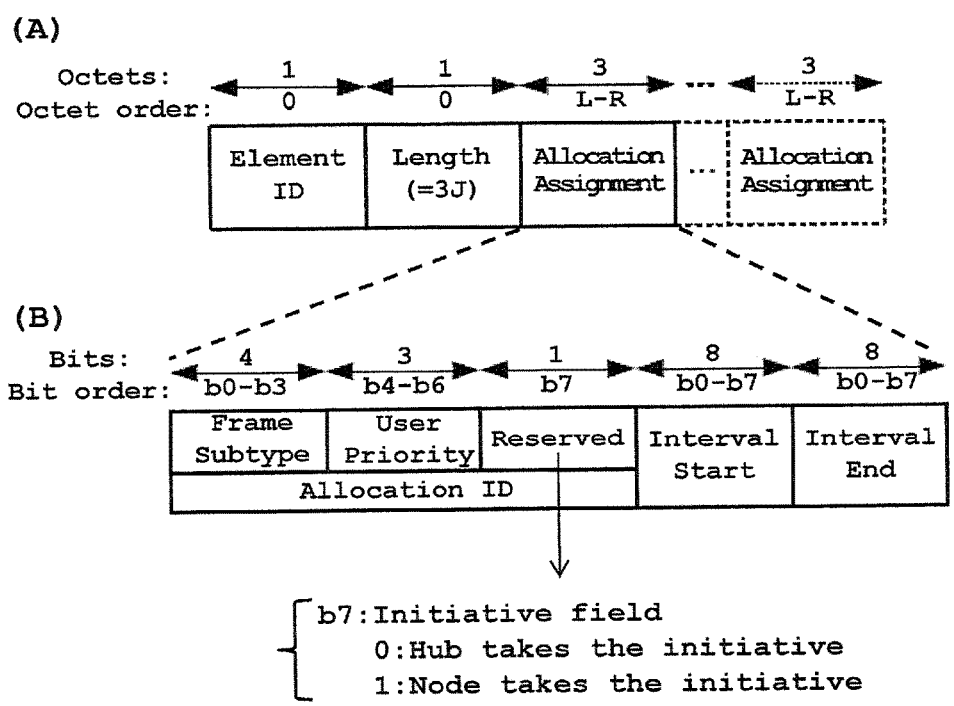
FIG. 11 shows (A) a format of an Uplink Assignment IE, a Downlink Assignment IE, a Bilink Assignment IE, or a Type-I Unscheduled Bilink Assignment IE of a Connection Assignment frame, and (B) a format of an Allocation Assignment field of the IE, according to an embodiment of the invention.
Figure 12:
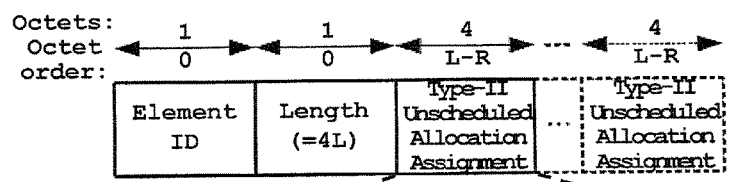
FIG. 12 shows (A) a format of a Type-II Unscheduled Bilink Assignment IE of a Connection Assignment frame, and (B) a format of a Type-II Unscheduled Allocation Assignment field of the IE, according to an embodiment of the invention.
Figure 12:
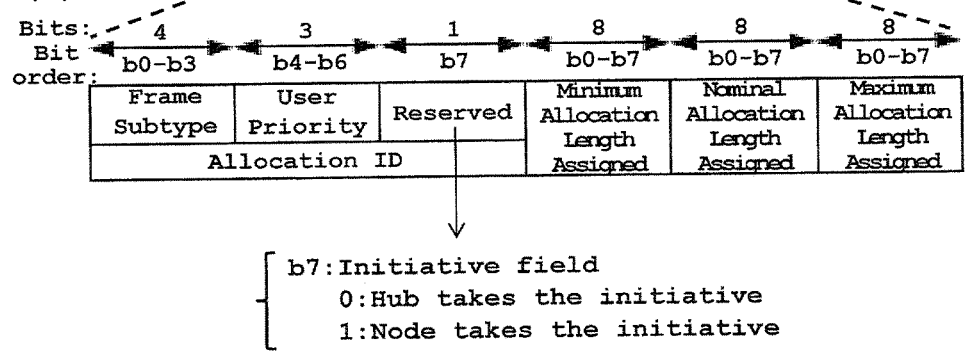

The Uplink Assignment IE of the Connection Assignment frame is formatted as shown in (A) of FIG. 11 (where J is the number of Allocation Assignment fields contained in the IE). The Uplink Assignment IE is optionally contained in the Connection Assignment frame to assign or reassign one or more allocation slot-based scheduled uplink allocations to the node, which is the recipient of the frame, in beacon or non-beacon mode with superframes. One or more Allocation Assignment fields are present. Each Allocation Assignment field is formatted as shown in (B) of FIG. 11. As shown in (B) of FIG. 11, the Allocation Assignment field contains a Reserved field of one (1) bit.

The Downlink Assignment IE of the Connection Assignment frame is formatted as shown in (A) of FIG. 11 in conjunction with (B) of FIG. 11. The Downlink Assignment IE is optionally contained in Connection Assignment frames to assign one or more allocation slot-based scheduled downlink allocations to the node, which is the recipient of the frame, in beacon or non-beacon mode with superframes.

The Bilink Assignment IE of the Connection Assignment frame is formatted as shown in (A) of FIG. 11 in conjunction with (B) of FIG. 11. The Bilink Assignment IE is optionally contained in Connection Assignment frames to assign one or more allocation slot-based scheduled Bilink allocations to the node, which is the recipient of the frame, in beacon or non-beacon mode with superframes.

The Unscheduled Bilink Assignment IE of the Connection Assignment frame is either Type-I Unscheduled Bilink Assignment IE or Type-II Unscheduled Bilink Assignment IE. The Type-I Unscheduled Bilink Assignment IE is formatted as shown in (A) of FIG. 11 in conjunction with (B) of FIG. 11, and is optionally contained in the Connection Assignment frame to assign or reassign one or more allocation slot-based unscheduled bilink allocations to the node, which is the recipient of the frame, in beacon or non-beacon mode with superframes. The Type-II Unscheduled Bilink Assignment IE is formatted as shown in (A) of FIG. 12 (where L is the number of Type-II Unscheduled Allocation Assignment fields contained in the IE). The Type-II Unscheduled Bilink Assignment IE is optionally contained in the Connection Assignment frame to assign or reassign one or more frame count-based unscheduled bilink allocations to the node, which is the recipient of the frame, in non-beacon mode without superframes. One or more Type-II Unscheduled Allocation Assignment fields are present in the Type-II Unscheduled Bilink Assignment IE. Each Type-II Unscheduled Allocation Assignment field is formatted as shown in (B) of FIG. 12. As shown in (B) of FIG. 12, the Type-II Unscheduled Allocation Assignment field contains a Reserved field of one (1) bit.

In the present embodiment, the hub designates one bit which is reserved of the Allocation Assignment field of the Uplink Assignment IE, the Downlink Assignment IE, the Bilink Assignment IE, or the Unscheduled Bilink Assignment IE of the Connection Assignment frame as an initiative field. In the case of allowing the node to take the initiative of communication, the hub sets the initiative field to one (1). In the case that the hub takes the initiative of communication, the hub sets the initiative field to zero (0). More specifically, in the case that the hub allows the node to take the initiative in a scheduled uplink allocation, the hub sets the one bit which is reserved in the Allocation Assignment field of the Uplink Assignment IE to one (1) as shown in (B) of FIG. 11. In the case that the hub allows the node to take the initiative in a scheduled downlink allocation, the hub sets the one bit which is reserved in the Allocation Assignment field of the Downlink Assignment IE to one (1) as shown in (B) of FIG. 11. In the case that the hub allows the node to take the initiative in a scheduled bilink allocation, the hub sets the one bit which is reserved in the Allocation Assignment field of the Bilink Assignment IE to one (1) as shown in (B) of FIG. 11. In the case that the hub allows the node to take the initiative in a Type-I unscheduled bilink allocation, the hub sets the one bit which is reserved in the Allocation Assignment field of the Unscheduled Bilink Assignment IE to one (1) as shown in (B) of FIG. 11. In the case that the hub allows the node to take the initiative in a Type-II unscheduled bilink allocation, the hub sets the one bit which is reserved in the Type-II Unscheduled Allocation Assignment field of the Unscheduled Bilink Assignment IE to one (1) as shown in (B) of FIG. 12. On the other hand, in the case that the hub takes the initiative conventionally, the hub sets the one bit which is reserved to zero (0).

The hub makes a determination on whether to set the initiative field of a Connection Assignment frame to one (1) based on at least one of the kind of the terminal of the node (for example, whether or not the node is a device for frequently transmitting data), the battery remains of the node, the amount of data to be transmitted, and setting of the user (whether or not there is an input from the user for instructing terminal(s) to operate in low-power mode), for example. The node determines whether to operate in normal mode or low-power mode based on the value of the initiative field of the Connection Assignment frame received from the hub.

According to another embodiment of the present invention, in the case that the initiative field of a Connection Request frame received from the node is set to one (1) (in other words, the node requests the hub to hand the initiative to the node), the hub responds to the request of the node by setting the initiative field of a Connection Assignment frame to zero (0) or one (1). In this embodiment, according to the response of the hub to the request of the node for the initiative, it is determined whether or not the node takes the initiative.

In the embodiments described above, one bit, which is reserved, of the Allocation Request field the IE of the payload of the Connection Request frame or one bit, which is reserved, of the Allocation Assignment field the IE of the payload of the Connection Assignment frame is used as the initiative field. However, the present invention is not limited to these embodiments and any one bit which is reserved may be used as the initiative field. For example, one bit, which is reserved, of four bits in the Frame Control of the MAC header of a Connection Request frame or a Connection Assignment frame (see (A) to (C) of FIG. 6) is designated as an initiative field. In the case of allowing the node to take the initiative of communication, the initiative field is set to one (1). In the case of allowing the node to take the initiative of communication, the initiative field is set to one (1). In the case of letting the hub take the initiative of the communication, the initiative field is set to zero (0). In another embodiment, the Frame Type field or the Frame Subtype field which is reserved of the MAC header (see Table 1) may be used as the initiative field.

In yet another embodiment, the four (4) bits, which are reserved, of the Frame Control of the MAC header of a Connection Request frame and/or a Connection Assignment frame (see (A) to (C) of FIG. 6) are designated as an initiative field for a scheduled uplink allocation, a scheduled downlink allocation, a scheduled bilink allocation, and an unscheduled bilink allocation. The kind of field used as the initiative field does not constitute the fundamental idea of the invention.

Figure 13:
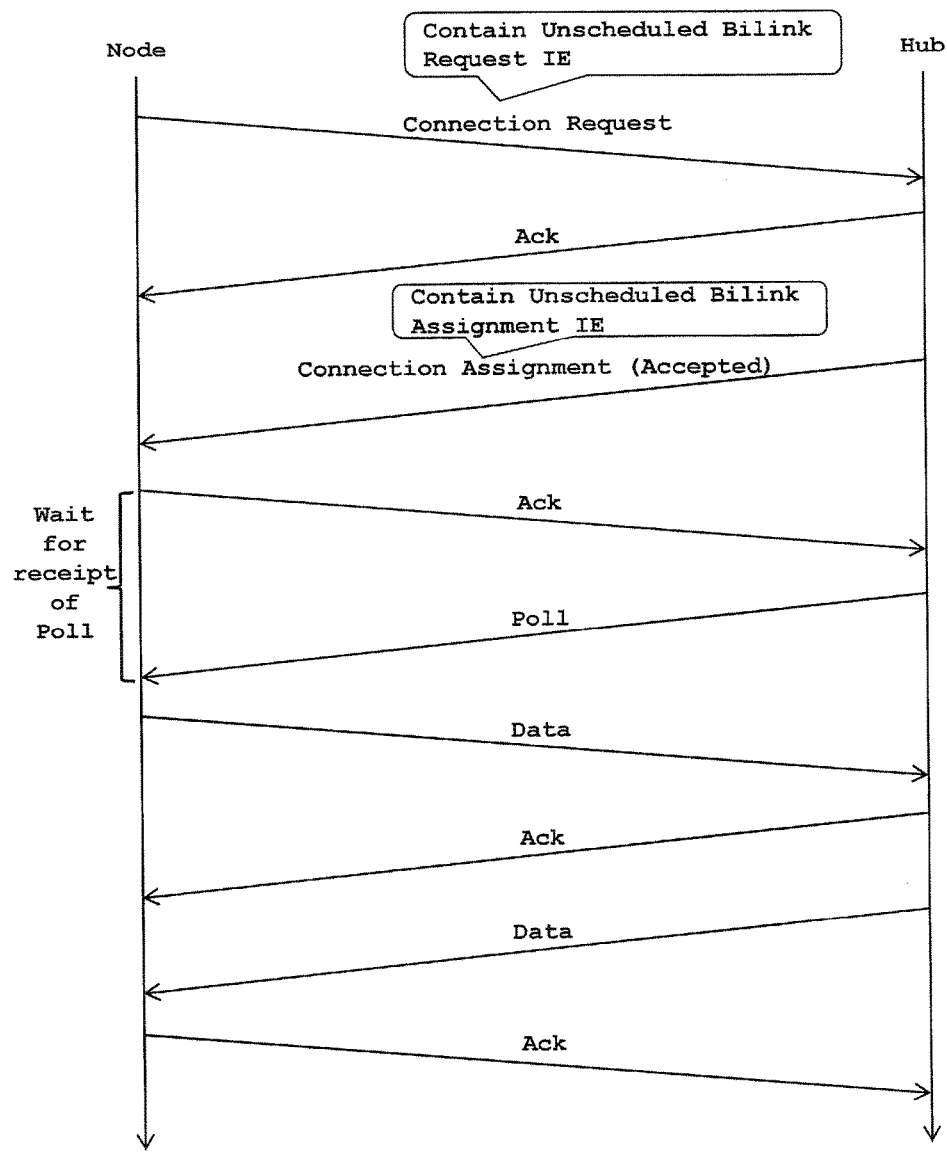
FIG. 13 is a signal flow diagram showing a process of conventional Type-I unscheduled bilink communication.
Figure 14:
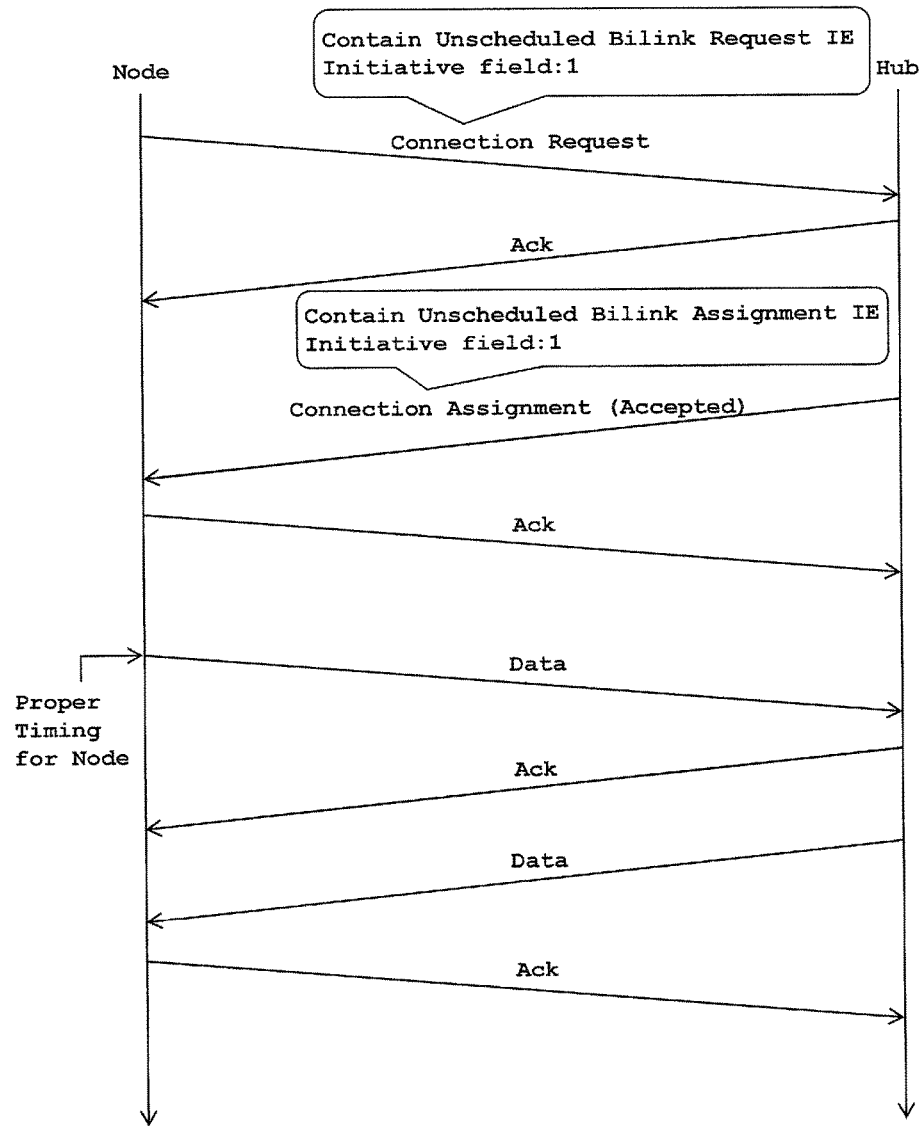
FIG. 14 is a signal flow diagram showing a process of Type-I unscheduled bilink communication according to an embodiment of the invention.

Next, signal flow is explained for communication in unscheduled bilink allocation(s) in beacon or non-beacon mode with superframes (or, type-I unscheduled bilink allocation(s)) by way of example. FIG. 13 is a signal flow diagram showing a process of conventional (in other words, in normal mode) Type-I unscheduled bilink communication. FIG. 14 is a signal flow diagram showing a process of Type-I unscheduled bilink communication according to an embodiment of the invention.

Referring to FIG. 13, a node wanting to connect to a hub generates a Connection Request frame and transmits it to the hub. The Connection Request frame contains the Unscheduled Bilink Request IE. If the hub receives the Connection Request frame, the hub transmits an Ack frame which is a receipt acknowledgement message to the node. Then, in the case that there is a reason for rejecting the connection request of the node, the hub generates a Connection Assignment frame in which the Connection Status field of the Mode/Status field is set to one of one (1) to ten (10) according to the reason and transmits it to the node. Thus, the connection process ends. In the case that there is no reason for rejecting the connection request of the node, the hub generates a Connection Assignment frame in which the Connection Status field of the Mode/Status field is set to zero (0) and transmits it to the node. If the node receives the Connection Assignment frame in which the Connection Status field of the Mode/Status field is set to zero (0), the node transmits an Ack frame to the hub and stands by in the receivable state. As shown in FIG. 13, if the node receives a poll (or a data frame) from the hub, the node transmits a data frame to the hub.

Since the hub takes the initiative in the conventional bilink communication as described above, the node should maintain the receipt standby state until the poll is received from the hub in a given allocation slot. In particular, for the unscheduled allocation in which an allocation slot can be shifted in time, the receipt standby time may be too long. This receipt standby time results in increase of power consumption of the node.

Referring to FIG. 14, a Connection Request frame which a node transmits to a hub contains the Unscheduled Bilink Request IE and the IE contains the initiative field according to the present embodiment (see (A) and (B) of FIG. 8). The hub processes the Connection Request frame and, in the case that the initiative field is set to one (1), the hub determines whether to allow the node to take the initiative. In the case of allowing the node to take the initiative, the hub generates a Connection Assignment frame in which the initiative field contained in the Unscheduled Bilink Assignment IE is set to one (1) (see (A) and (B) of FIG. 11). On the other hand, in the case of not allowing the node to take the initiative, the hub generates a Connection Assignment frame in which the initiative field contained in the Unscheduled Bilink Assignment IE is set to zero (0). As described above, the present invention is not limited to the above embodiment in which the Connection Request frame contains the initiative field in the Unscheduled Bilink Request IE and the initiative field may be contained in a different area of the Connection Request frame (for example, a reserved field of the MAC header of the frame). Similarly, the present invention is not limited to the embodiment in which the Connection Assignment frame contains the initiative field in the Unscheduled Bilink Assignment IE and the initiative field may be contained in a different area of the Connection Assignment frame (for example, a reserved field of the MAC header of the frame).

The node operates in low-power mode in the case that the initiative field of the Connection Assignment frame received from the hub is set to one (1). Thus, the node initiates data communication at proper timing in a given allocation slot (in other words, the node initiates transmission of data frame (s)). Accordingly, the node does not need to maintain the receipt standby state until the transmission allowance notice is received from the hub as it does conventionally. Therefore, it is possible to reduce power consumption of the node. The proper timing can be determined, for example, according to the amount of data to be transmitted to the hub by the node.

Further, according to the embodiment shown in FIG. 14, in the case that the initiative field contained in the Unscheduled Bilink Request IE of the Connection Request frame is set to one (1) and the initiative field contained in the Unscheduled Bilink Request IE of the Connection Assignment frame is set to one (1), the node takes the initiative. However, the present invention is not limited thereto. In other embodiments, a hub allows a node to take the initiative of communication only by receiving a Connection Request frame in which the initiative field is set to one (1) from the node.

Figure 15:
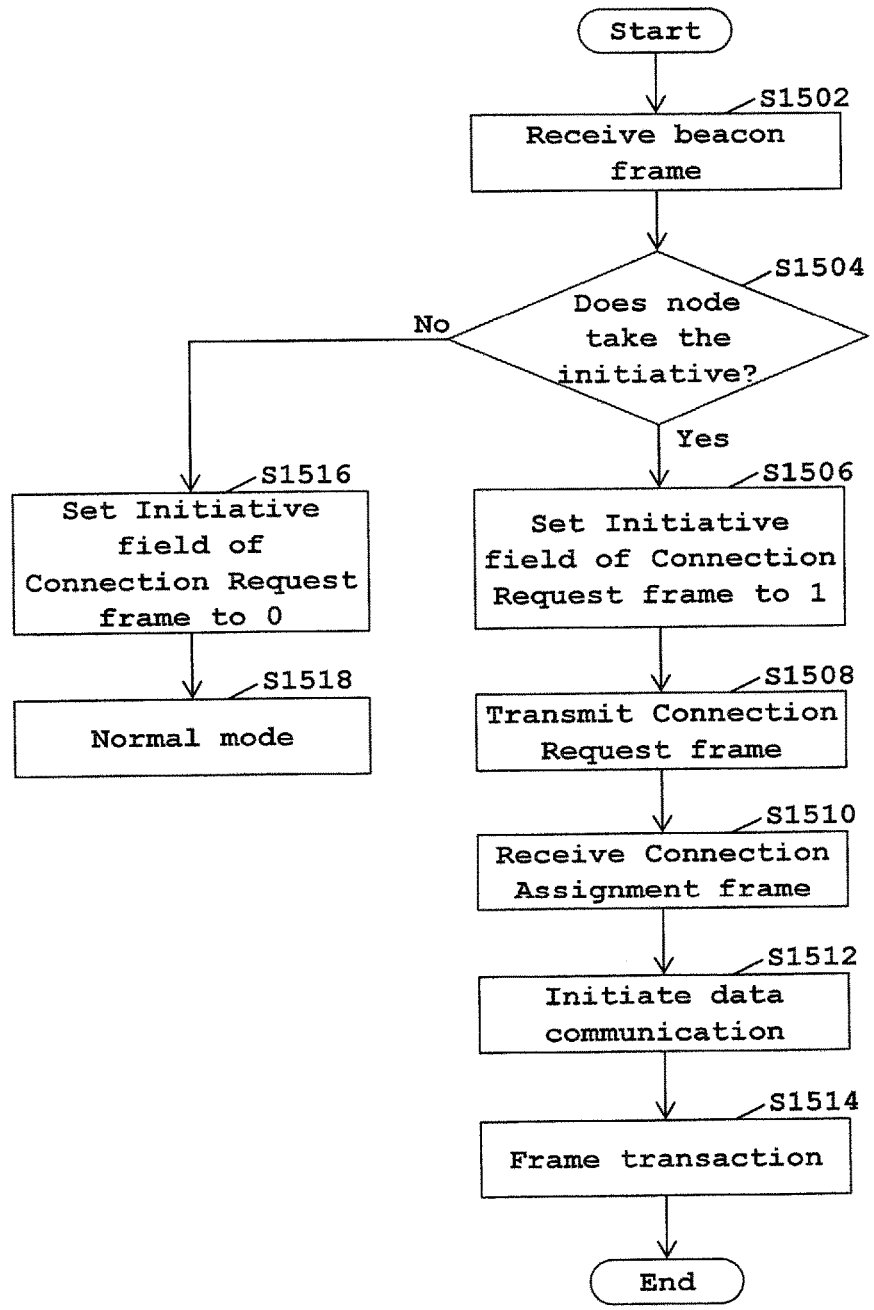
FIG. 15 is a flow chart showing operations of an algorithm performed by a node according to an embodiment of the invention.
Figure 16:
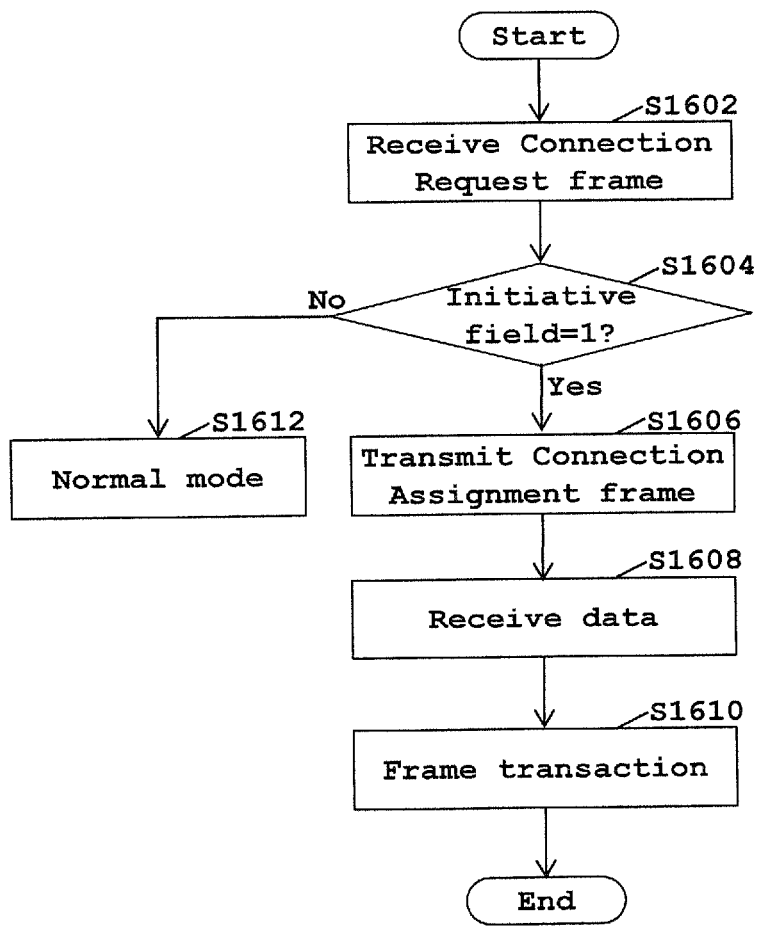
FIG. 16 is a flow chart showing operations of an algorithm performed by a hub according to an embodiment of the invention.

FIGS. 15 and 16 are flow charts showing operations of algorithms performed by a node and a hub, respectively, for communication in unscheduled bilink allocation(s) in beacon or non-beacon mode with superframes (or, type-I unscheduled bilink allocation(s)), by way of example, according to an embodiment of the invention. In the following, details of FIG. 15 will be described referring to FIG. 2.

In the case that the wireless communicator 310 of the node 300 receives a beacon frame transmitted from the hub 200 (Step S1502), the processor 320 of the node 300 processes the beacon frame. The processor 320 determines whether to take the initiative of bilink communication with the hub 200 (Step S1504). This determination is made based on at least one of the kind of the terminal of the node 300 (for example, whether or not the node is a device for frequently transmitting data), the battery remains of the node 300, the amount of data to be transmitted, and setting of the user (whether or not there is an input from the user for instructing terminal(s) to operate in low-power mode), for example. In the case that the node 300 determines to take the initiative of the bilink communication (Step S1504: YES), it generates a Connection Request frame in which the initiative field is set to one (1) (Step S1506). The wireless communicator 310 transmits the Connection Request frame to the hub 200 (Step S1508).

Then, in the case that the node 300 receives a Connection Assignment frame from the hub 200 for accepting the connection request (Step S1510), the node 300 operates low-power mode. More specifically, the node initiates data communication at proper timing without waiting for receipt of a poll or a data frame from the hub 200 in a given allocation slot (Step S1512). In other words, the node transmits a data frame to the hub at proper timing without waiting for receipt of a poll or a data frame from the hub. The proper timing can be determined, for example, according to the amount of data to be transmitted by the node. Then, one or more frame transaction(s) are performed between the node and the hub (Step S1514). If a given allocation slot ends, the node and the hub stop the frame transactions.

In the case that the node 300 does not take the initiative of the bilink communication (Step S1504: NO), the node 300 sets the initiative field of the Connection Request frame to zero (0) (Step S1516) and operates in normal mode, in other words, according to the conventional process shown in FIG. 13 (Step S1518).

In the following, operations of the hub according to the present embodiment will be described with reference to FIG. 16 in conjunction with FIG. 2.

In the case that the wireless communicator 210 of the hub 200 receives a Connection Request frame transmitted by the node 300 (Step S1602), the processor 220 of the hub 200 processes the Connection Request frame. The processor 220 determines whether or not the initiative field contained in the Connection Request frame is set to one (1) (Step S1604). In the case that the initiative field contained in the Connection Request frame is set to one (1) (Step S1604: YES), the hub 200 operates in low-power mode. In other words, the hub allows the node to take the initiative of bilink communication between them. Then, the hub 200 transmits a Connection Assignment frame to the node 300 (Step S1606). In this case, the hub 200 neither transmits a poll to the node 300 nor initiates data communication. In the case that the wireless communicator 210 receives a data frame from the node 300 (Step S1608), one or more frame transaction(s) are performed between the node and the hub (Step S1610). If a given allocation slot ends, the node and the hub stop the frame transactions.

On the other hand, in the case that the initiative field contained in the Connection Request frame is not set to one (1) (Step S1604: NO), the hub operates in normal mode, in other words, according to the conventional process shown in FIG. 13 (Step S1612).

Figure 17:
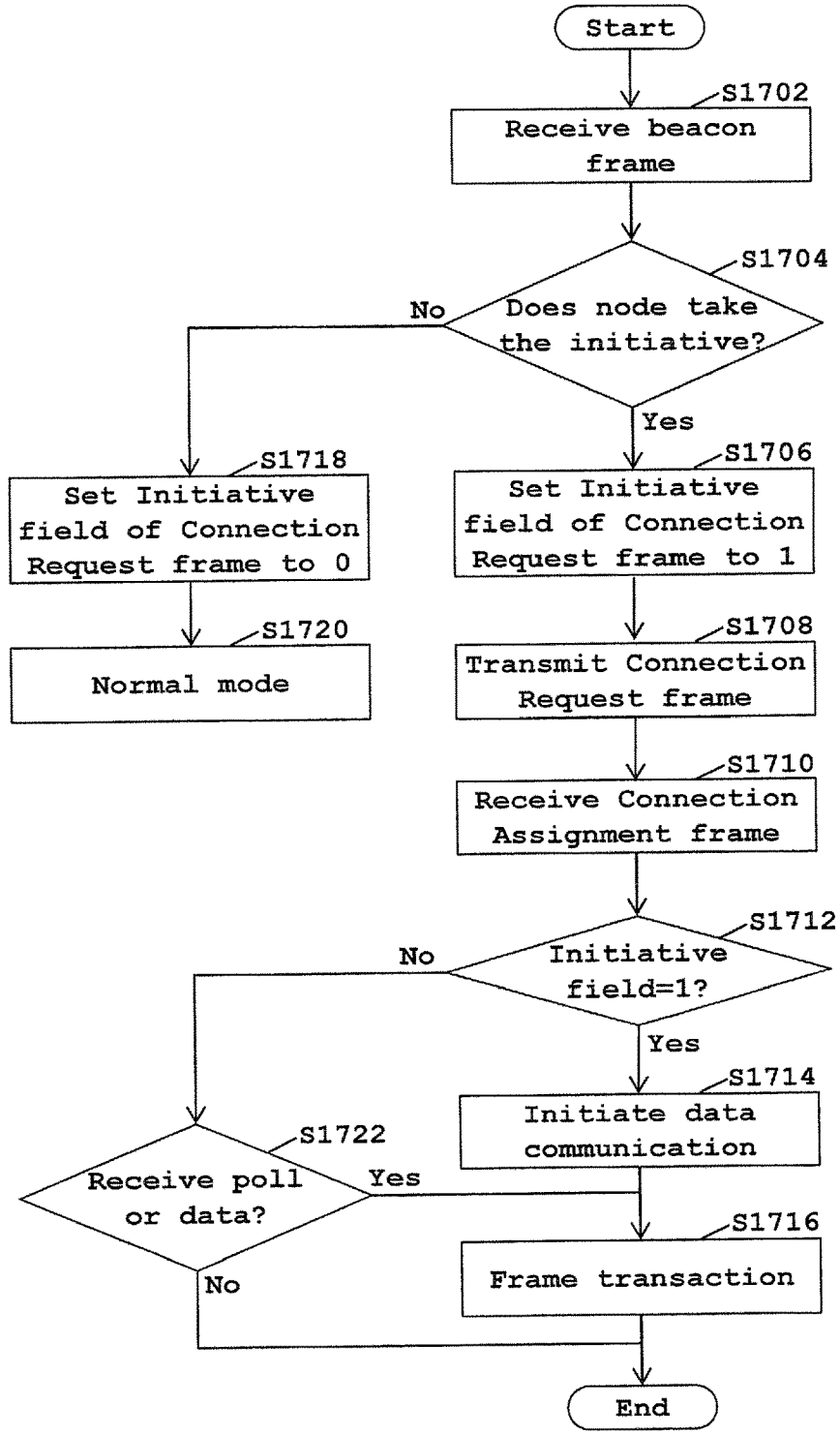
FIG. 17 is a flow chart showing operations of an algorithm performed by a node according to another embodiment of the invention.
Figure 18:
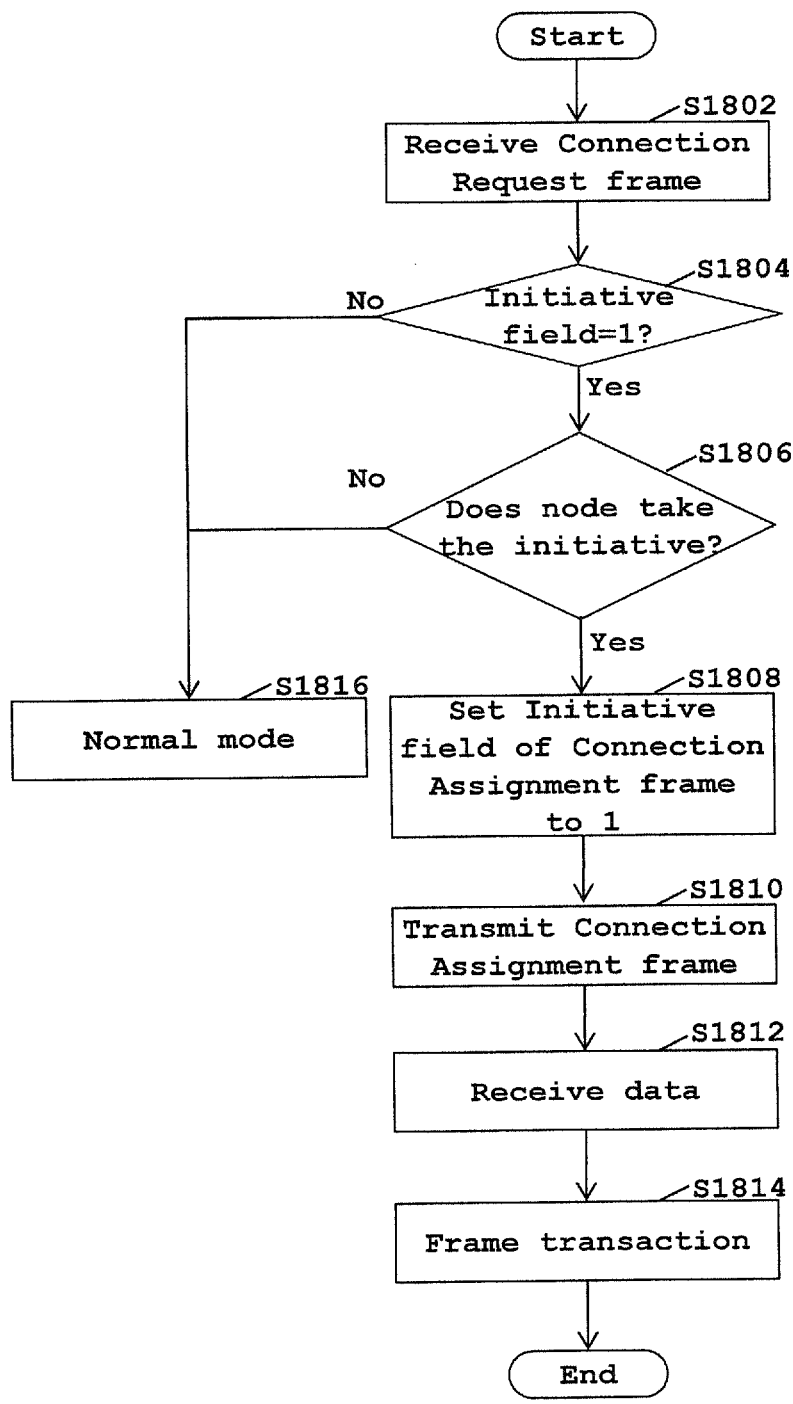
FIG. 18 is a flow chart showing operations of an algorithm performed by a hub according to another embodiment of the invention.

FIGS. 17 and 18 are flow charts showing operations of algorithms performed by a node and a hub, respectively, for communication in unscheduled bilink allocation(s) in beacon or non-beacon mode with superframes (or, type-I unscheduled bilink allocation(s)), by way of example, according to another embodiment of the invention. First, details of FIG. 17 will be described referring to FIG. 2.

In the case that the wireless communicator 310 of the node 300 receives a beacon frame transmitted from the hub 200 (Step S1702), the processor 320 of the node 300 processes the beacon frame. The processor 320 determines whether to take the initiative of bilink communication with the hub 200 (Step S1704). This determination is made based on at least one of the kind of the terminal of the node 300 (for example, whether or not the node is a device for frequently transmitting data), the battery remains of the node 300, the amount of data to be transmitted, and setting of the user (whether or not there is an input from the user for instructing terminal(s) to operate in low-power mode), for example. In the case that the node 300 determines to take the initiative of the bilink communication (Step S1704: YES), it generates a Connection Request frame in which the initiative field is set to one (1) (Step S1706). The wireless communicator 310 transmits the Connection Request frame to the hub 200 (Step S1708).

Then, in the case that the node 300 receives a Connection Assignment frame from the hub 200 for assigning one or more slots for the bilink communication (Step S1710), the node 300 determines whether or not the initiative field contained in the Connection Assignment frame is set to one (1) (Step S1712). In the case that the initiative field contained in the Connection Assignment frame is set to one (1) (Step S1712: YES), in other words, the hub 200 allows the node 300 to take the initiative, the node 300 operates in low-power mode. More specifically, the node 300 initiates data communication at proper timing without waiting for receipt of a poll or a data frame from the hub 200 in a given allocation slot (Step S1714). The proper timing can be determined, for example, according to the amount of data to be transmitted by the node. Then, one or more frame transaction(s) are performed between the node and the hub (Step S1716). If a given allocation slot ends, the node and the hub stop the frame transactions.

In the case that the node 300 does not take the initiative of the bilink communication (Step S1704: NO), the node 300 sets the initiative field of the Connection Request frame to zero (0) (Step S1718) and operates in normal mode, in other words, according to the conventional process shown in FIG. 13 (Step S1720).

In the case that the initiative field contained in the Connection Assignment frame is not set to one (1) (Step S1712: NO), in other words, the hub 200 does not allow the node 300 to take the initiative, the node 300 waits for receipt of a poll or a data frame from the hub 200 (Step S1722). In the case that a poll or a data frame is received from the hub 200 within a predetermined time period (Step S1722: YES), one or more frame transaction(s) are performed between the node and the hub (Step S1716). If a given allocation slot ends, the node and the hub stop the frame transactions. On the other hand, in the case that neither a poll nor a data frame is received from the hub 200 within the predetermined time period (Step S1722: NO), the present allocation interval ends in the state where the node 300 transmits no data frame. The predetermined time period can be determined according to the length of the allocation slot(s), for example.

Then, details of FIG. 18 will be described referring to FIG. 2. In the case that the wireless communicator 210 of the hub 200 receives a Connection Request frame transmitted by the node 300 (Step S1802), the processor 220 of the hub 200 processes the Connection Request frame. The processor 220 determines whether or not the initiative field contained in the Connection Request frame is set to one (1) (Step S1804). In the case that the initiative field contained in the Connection Request frame is set to one (1) (Step S1804: YES), in other words, the node 300 requests the hub 200 to allow the node 300 to take the initiative of the bilink communication, the hub 200 determines whether to allow the node 300 to take the initiative (Step S1806). This determination is made based on at least one of the kind of the terminal of the node 300 (for example, whether or not the node is a device for frequently transmitting data), the battery remains of the node 300, the amount of data to be transmitted, and setting of the user (whether or not there is an input from the user for instructing terminal(s) to operate in low-power mode), for example.

In the case that the hub 200 allows the node 300 to take the initiative of the bilink communication (Step S1806: YES), the processor 220 of the hub 200 generates a Connection Assignment frame in which the initiative field is set to one (1) (Step S1808). The wireless communicator 210 transmits the Connection Assignment frame to the node 300 (Step S1810) and the processor 220 operates in low-power mode. In this case, the hub 200 neither transmits a poll to the node 300 nor initiates data communication. In the case that the wireless communicator 210 receives a data frame from the node 300 (Step S1812), one or more frame transaction(s) are performed between the node and the hub (Step S1814). If a given allocation slot ends, the node and the hub stop the frame transactions.

On the other hands, in the case that the initiative field contained in the Connection Request frame is not set to one (1) (Step S1804: NO), the hub 200 operates in normal mode, in other words, according to the conventional process shown in FIG. 13 (Step S1816). Further, in the case that the hub 200 does not allow the node 300 to take the initiative (Step S1806: NO), the initiative field of the Connection Assignment frame is set to zero (0). The hub 200 operates in normal mode, in other words, according to the conventional process shown in FIG. 13 (Step S1816).

Figure 19:
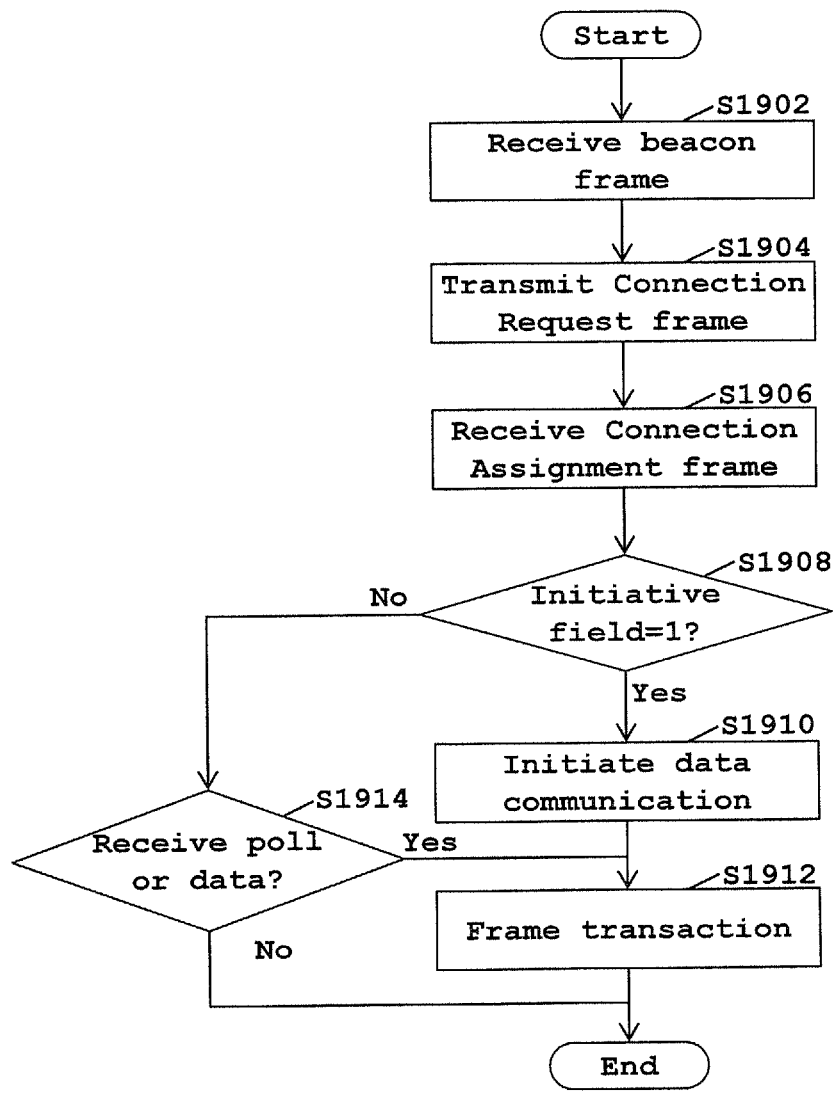
FIG. 19 is a flow chart showing operations of an algorithm performed by a node according to another embodiment of the invention.
Figure 20:
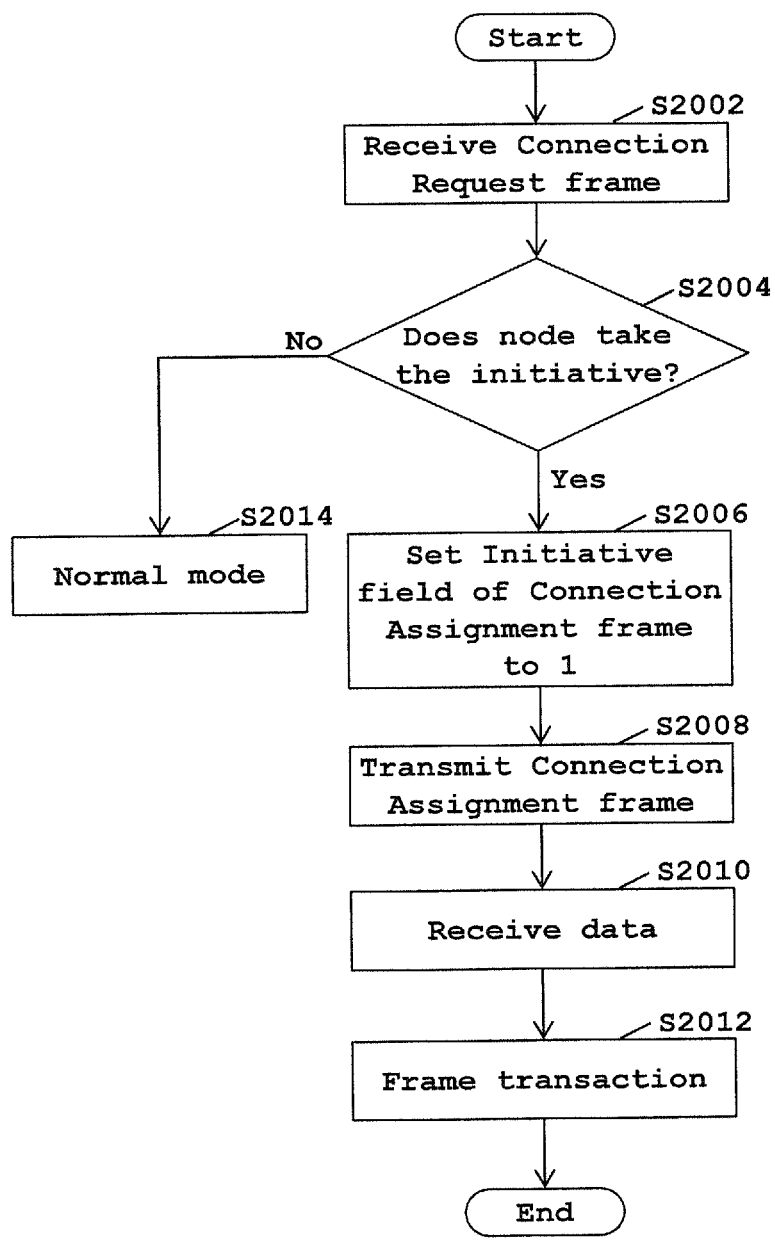
FIG. 20 is a flow chart showing operations of an algorithm performed by a hub according to another embodiment of the invention.

FIGS. 19 and 20 are flow charts showing operations of algorithms performed by a node and a hub, respectively, for communication in unscheduled bilink allocation(s) in beacon or non-beacon mode with superframes (or, type-I unscheduled bilink allocation(s)), by way of example, according to yet another embodiment of the invention. First, details of FIG. 17 will be described referring to FIG. 2. The present embodiment is different from those of FIGS. 15 to 18 in that information showing the initiative of communication is contained only in Connection Assignment frames. First, details of FIG. 19 will be described referring to FIG. 2.

In the case that the wireless communicator 310 of the node 300 receives a beacon frame transmitted from the hub 200 (Step S1902), the processor 320 of the node 300 processes the beacon frame. The node 300 generates a Connection Request frame and transmits it to the hub 200 (Step S1904). Then, in the case of receiving a Connection Assignment frame from the hub 200 (Step S1906), the node 300 determines whether or not the initiative field contained in the Connection Assignment frame is set to one (1) (Step S1908). In the case that the initiative field contained in the Connection Assignment frame is set to one (1) (Step S1908: YES), in other words, the node 300 is allowed to take the initiative of the communication, the node 300 operates in low-power mode. More specifically, the node 300 initiates data communication at proper timing without waiting for receipt of a poll or a data frame from the hub 200 in a given allocation slot (Step S1910). The proper timing can be determined, for example, according to the amount of data to be transmitted by the node. Then, one or more frame transaction(s) are performed between the node and the hub (Step S1912). If a given allocation slot ends, the node and the hub stop the frame transactions.

On the other hand, in the case that the initiative field contained in the Connection Assignment frame is not set to one (1) (Step S1908: NO), the node 300 waits for receipt of a poll or a data frame from the hub 200 (Step S1914). In the case that a poll or a data frame is received from the hub 200 within a predetermined time period (Step S1914: YES), one or more frame transaction(s) are performed between the node and the hub (Step S1912). If a given allocation slot ends, the node and the hub stop the frame transactions. On the other hand, in the case that neither a poll nor a data frame is received from the hub 200 within the predetermined time period (Step S1914: NO), the present allocation interval ends in the state where the node 300 transmits no data frame. The predetermined time period can be determined according to the length of the allocation slot(s), for example.

Then, details of FIG. 20 will be described referring to FIG. 2. In the case that the wireless communicator 210 of the hub 200 receives a Connection Request frame transmitted by the node 300 (Step S2002), the processor 220 of the hub 200 processes the Connection Request frame. The processor 220 determines whether to allow the node to take the initiative (in other words, whether to operate in low-power mode) (Step S2004). This determination is made based on at least one of the kind of the terminal of the node 300 (for example, whether or not the node is a device for frequently transmitting data), the battery remains of the node 300, the amount of data to be transmitted, and setting of the user (whether or not there is an input from the user for instructing terminal(s) to operate in low-power mode), for example. In the case of allowing the node 300 to take the initiative of the bilink communication (Step S2004: YES), the hub 200 generates a Connection Assignment frame in which the initiative field is set to one (1) (Step S2006). The wireless communicator 210 transmits the Connection Assignment frame to the node 300 (Step S2008) and the processor 220 operates in low-power mode. In this case, the hub 200 neither transmits a poll to the node 300 nor initiates data communication. In the case that the wireless communicator 210 receives a data frame from the node 300 (Step S2010), one or more frame transaction(s) are performed between the node and the hub (Step S2012). If a given allocation slot ends, the node and the hub stop the frame transactions.

On the other hand, in the case that the hub 200 does not allow the node 300 to take the initiative, in other words, the hub does not operate in low-power mode (Step S2004: NO), the hub 200 operates in normal mode, in other words, according to the conventional process shown in FIG. 13 (Step S2014).

Second Embodiment

Figure 21A:
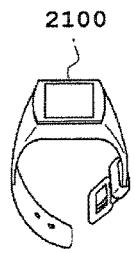
FIG. 21 shows (A) an exterior view of an electronic timepiece type device according to an embodiment of the invention, and (B) a block diagram showing a hardware configuration of the electronic timepiece type device according to the embodiment of the invention.
Figure 21B:
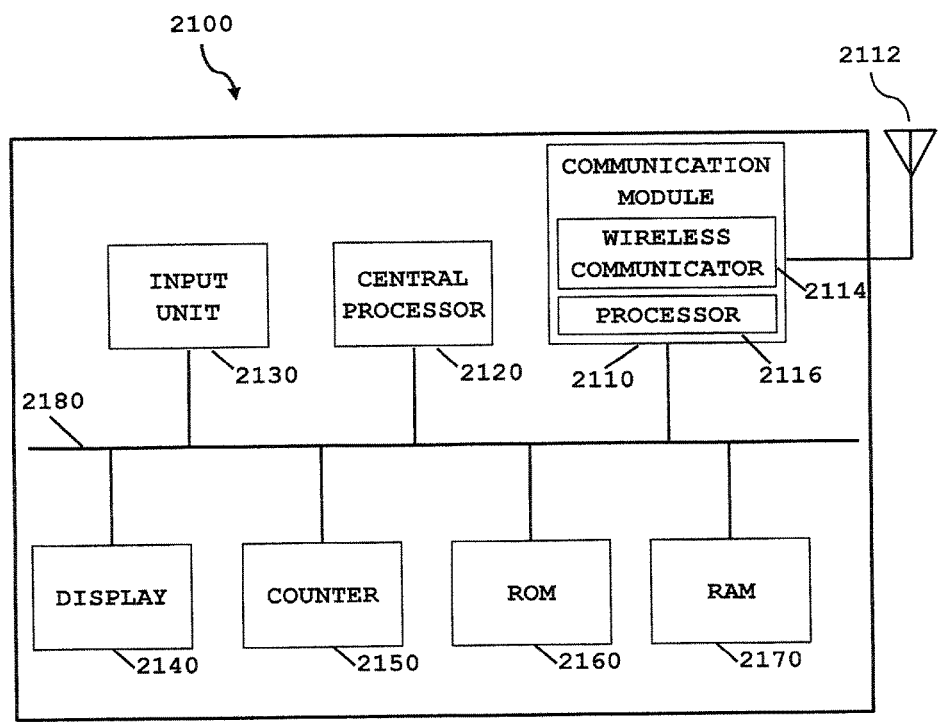

FIG. 21 shows an embodiment of a device capable of functioning as the hub or the node in the BAN. An exterior view of the device is shown in (A) of FIG. 21 and a block diagram showing a hardware configuration of the device is shown in (B) of FIG. 21. In the present embodiment, the device is an electronic timepiece. As shown in (B) of FIG. 21, an electronic timepiece 2100 includes a communication module 2110, and the communication module 2110 includes an antenna 2112, a wireless communicator 2114, and a processor 2116. The processor 2116 processes messages exchanged via the antenna 2112 and the wireless communicator 2114 and/or via a wireline connected to the internet or a different body area network (not shown in the drawing). The processor 2116 may include software, firmware, or hardware. Since the configurations and functions of the antenna 2112, the wireless communicator 2114, and the processor 2116 are the same as those of the antenna 212 or 312, the wireless communicator 210 or 310, and the processor 220 or 320 as described with respect to FIG. 2, more detailed explanation on them is omitted. Further, the communication module 2110 may include a memory (not shown in the drawing) for storing frame data exchanged with other device(s), data such as the frame structure information, the medium access control information and the power management information, computer program instructions, software and/or firmware executed by the processor 2116, or the like.

A central processor 2120 includes a processing unit such as a CPU (Central Processing Unit) and controls operations of the timepiece 2100. For example, the central processor 2120 executes various processes according to programs recorded on a ROM 2160. The configurations and functions of the processor 220 or 320 described with respect to FIG. 2 can be realized by the central processor 2120 or cooperation of the central processor 2120 and the processor 2116.

An input unit 2130 includes a plurality of buttons (here, the buttons may be realized by hardware and/or software) having a function of inputting various information and instructions to the timepiece 2100. If a user manipulates the buttons, the input unit 2130 outputs instructions corresponding to the manipulated buttons to the central processor 2120. The central processor 2120 controls each unit to execute a predetermined operation according to the instructions input from the input unit 2130.

A display 2140 displays various kinds of information such as time or a message received from the outside according to an instruction from the central processor 2120.

A counter 2150 generates time signals from signals generated by a system clock or an oscillator and outputs current time.

The ROM 2160 is used to store control programs executed by the central processor 2120 and the like. Further, the ROM 2160 may be used to store computer program instructions, software and/or firmware executed by the processor 2116.

A RAM 2170 provides a work area when the central processor 2120 executes various processes and is used to store data processed by each unit of the timepiece 2100. The RAM 2170 may be used to store data such as the frame structure information, the medium access control information, and the power management information, as well as the frame data transmitted or received.

The timepiece 2100 can be connected to other device. The other device includes a sensor used to monitor data from the body such as body temperature, respiration, heart rate, or blood sugar, or a device for providing a function of controlling a pace maker, a respirator, an insulin pump, or the like, for example.

The present invention has been described with respect to specific embodiments in which it has been applied to the BAN but its application field is not limited to the BAN. For example, the invention can be applied to different wireless communication technologies such as Bluetooth®, Wi-Fi®, and Wi-Fi Direct®.

The processes described above can be executed by hardware or software. In the case that a specific process is executed by software, a program configuring the software is installed in the communication device serving as the hub or the node from a network or a storage medium. A recording medium for recording such a program thereon includes a removable media which is distributed separately from the device's main body to provide it to users or a recording medium or the like which is provided to users in a state of being incorporated in the device's main body in advance.

Many modifications and other embodiments of the invention will come to mind to one skilled in the art to which this invention pertains having the benefit of the teachings presented in the foregoing descriptions, and the associated drawings. Therefore, it is to be understood that the invention is not to be limited to the specific embodiments disclosed. Although specific terms are employed herein, they are used in a generic and descriptive sense only and not for purposes of limitation. These modifications and embodiments fall within the scope and the spirit of the invention described in this specification and within the scope of the invention as defined in the appended claims and equivalents thereof.

What is claimed is:

1. A device for communication according to a specific communication protocol comprising:
    a processor for generating a connection assignment frame for accepting a connection request of other device based on the communication protocol, the connection assignment frame including a predetermined field,
    wherein the processor determines whether or not to set the predetermined field of the connection assignment frame to a predetermined value based on data transmission frequency of the other device, and the processor does not transmit any data frame until the other device initiates data communication in the case of setting the predetermined field of the connection assignment frame to the predetermined value.

2. The device of claim 1, wherein the processor determines whether to set the predetermined field of the connection assignment frame to the predetermined value in the case of receiving a connection request frame in which a predetermined field is set to a predetermined value from the other device.

3. A timepiece comprising:
    a device of claim 1; and
    a counter configured to count current time.

4. A device for communication according to a specific communication protocol comprising:
    a processor for determining whether or not a predetermined field included in a connection request frame for requesting a connection to the device received from other device is set to a first value,
    wherein the processor determines whether or not to set a predetermined field of a connection assignment frame for accepting the connection request of the other device to a second value based on data transmission frequency of the other device in the case that the predetermined field of the connection request frame is set to the first value, and the processor does not transmit any data frame to the other device until the other device initiates data communication in the case that the predetermined field of the connection assignment frame is set to the second value.

5. A timepiece comprising:
    a device of claim 4; and
    a counter configured to count current time.

6. A communication method performed by a device capable of communication according to a specific communication protocol comprising:
    generating a connection assignment frame for accepting a connection request of other device, based on the communication protocol;
    determining whether or not to set a predetermined field of the connection assignment frame to a predetermined value based on data transmission frequency of the other device; and
    waiting until the other device initiates data communication without transmitting any data frame to the other device in the case of setting the predetermined field of the connection assignment frame to the predetermined value.

7. A communication method performed by a system comprising a first device and a second device for communication according to a specific communication protocol comprising:
    at the first device, generating a connection request frame for requesting a connection to the second device in which a predetermined field is set to a predetermined value, based on the communication protocol;

at the first device, transmitting the connection request frame to the second device;

at the second device, receiving the connection request frame to the first device;

at the second device, generating a connection assignment frame for accepting the connection request of the first device based on the communication protocol and determining whether or not to set a predetermined field of the connection assignment frame to a predetermined value based on data transmission frequency of the first device;

at the second device, transmitting the connection assignment frame to the first device;

at the first device, receiving the connection assignment frame from the second device; and at the first device, initiating data communication at predetermined timing in a time interval given for communication with the other device in the case that the predetermined field of the connection assignment frame is set to the predetermined value.

8. A non-transitory computer-readable recording medium for recording a computer program controlling a device capable of communication according to a specific communication protocol, the program causing the device to perform steps of:

generating a connection assignment frame for accepting a connection request of other device, based on the communication protocol and determining whether or not to set a predetermined field of the connection assignment frame to a predetermined value based on data transmission frequency of the other device; and waiting until the other device initiates data communication without transmitting any data frame to the other device in the case of setting the predetermined field of the connection assignment frame to the predetermined value.

* * * * *